United States Patent
Chhabra et al.

(10) Patent No.: US 12,314,460 B2
(45) Date of Patent: May 27, 2025

(54) MEMORY ADDRESS BUS PROTECTION FOR INCREASED RESILIENCE AGAINST HARDWARE REPLAY ATTACKS AND MEMORY ACCESS PATTERN LEAKAGE

(71) Applicant: Intel Corporation, Santa Clara, CA (US)

(72) Inventors: Siddhartha Chhabra, Portland, OR (US); Abhishek Basak, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 17/134,346

(22) Filed: Dec. 26, 2020

(65) Prior Publication Data

US 2022/0207194 A1 Jun. 30, 2022

(51) Int. Cl.
*G06F 21/85* (2013.01)
*G06F 7/58* (2006.01)
(Continued)

(52) U.S. Cl.
CPC .............. *G06F 21/85* (2013.01); *G06F 7/588* (2013.01); *G06F 21/572* (2013.01); *G06F 21/602* (2013.01)

(58) Field of Classification Search
CPC ........ G06F 21/57; G06F 21/85; G06F 21/572; G06F 21/602; G06F 7/588; G06F 12/1408; G06F 13/1668
See application file for complete search history.

(56) References Cited

U.S. PATENT DOCUMENTS 9,952,765 B2 * 4/2018 Krishnamachari ... G06F 3/0604
2019/0043600 A1 * 2/2019 Saileshwar ......... G06F 12/1408
(Continued)

FOREIGN PATENT DOCUMENTS

EP 2726991 A1 5/2014
WO 2013/002789 A1 1/2013

OTHER PUBLICATIONS

Aga et al., "InvisiMem: Smart Memory Defenses for Memory Bus Side Channel", Proceedings of The 44th Annual International Symposium On Computer Architecture, ISCA '17, Acm Press, Jun. 24, 2017, pp. 94-106.
(Continued)

*Primary Examiner* — Azizul Choudhury
(74) *Attorney, Agent, or Firm* — NICHOLSON DE VOS WEBSTER & ELLIOTT LLP

(57) ABSTRACT

Detailed herein are embodiments utilizing a cryptographically authenticated address bus (CAAB) protection that uses an intelligent memory design to prevent attacks on the address bus without detection and eliminate the memory bus as an observability surface for an attacker to do access pattern analysis. Embodiments detailed herein describe an intelligent memory module which has cryptographic capabilities. In some embodiments, a memory controller and an intelligent memory module exchange a key and using this key, the address (on the address bus) is encrypted and integrity protected using authenticated counter mode encryption. The memory controller on receiving a read or a write request encrypts the address (e.g., using pre-generated encrypted counters to minimize cryptographic overheads). A message authentication code (MAC) also gets generated along with the encrypted address to be able to detect modification to the encrypted address.

12 Claims, 21 Drawing Sheets

(51) Int. Cl.
*G06F 21/57* (2013.01)
*G06F 21/60* (2013.01)

(56) References Cited

U.S. PATENT DOCUMENTS

2020/0151362 A1 5/2020 Harriman et al.
2022/0179776 A1* 6/2022 Schrammel ......... G06F 11/3688

OTHER PUBLICATIONS

European Search Report and Search Opinion, EP App. No. 21198410.9, Feb. 25, 2022, 9 pages.

* cited by examiner

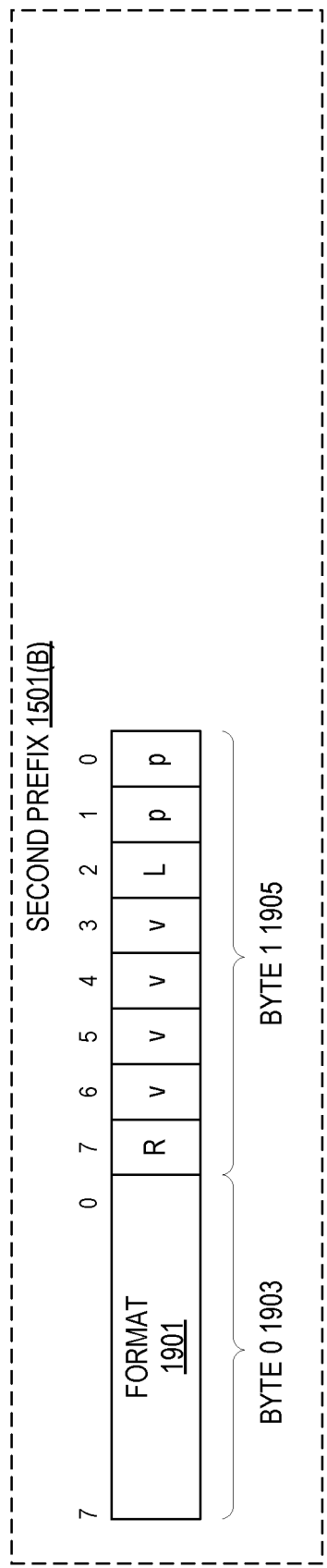
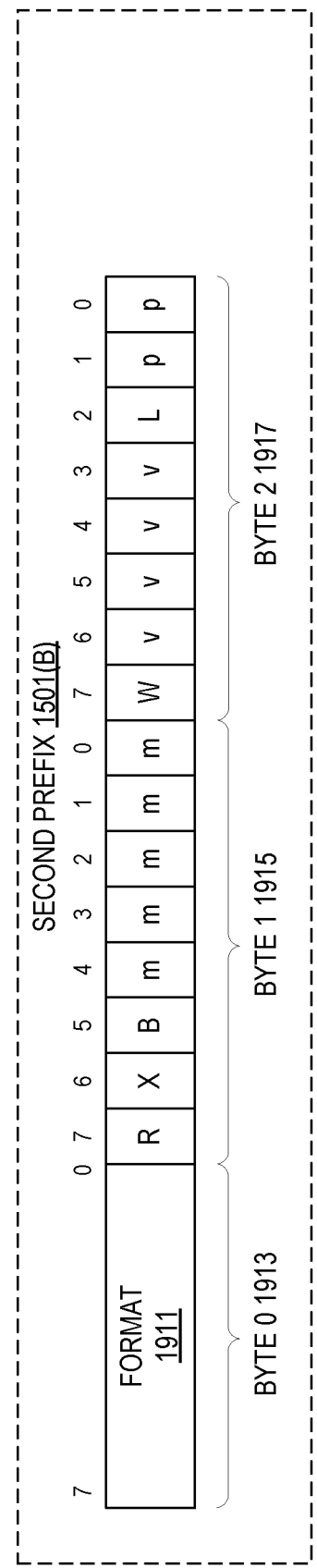
FIG. 19(A)
FIG. 19(B)

MEMORY ADDRESS BUS PROTECTION FOR INCREASED RESILIENCE AGAINST HARDWARE REPLAY ATTACKS AND MEMORY ACCESS PATTERN LEAKAGE

BACKGROUND

Current memory protection technologies like multikey encryption and multikey with integrity are centered around confidentiality and integrity (tamper) protection of the data on the memory data bus via hardware based cryptographic methods.

In current multikey encryption and multikey with integrity approaches, the memory address bus is left unprotected. This leaves the system vulnerable to other attacks such as hardware replay of stale data and access pattern monitoring. As an example, an attacker can flip a bit on the address bus to effectively result in a write getting dropped (written to a different location than intended). Such attacks can subvert the security of secure ranges by allowing the hardware attacker to do a successful replay attack (i.e., replaying stale version of a cache-line which was dropped/written out to a different region outside secure ranges). Using these simple address bit flip techniques, the attacker can mis-direct security critical data (potentially deterministically to allocated system address of interest) and also know when to replay stale data back.

BRIEF DESCRIPTION OF DRAWINGS

Various embodiments in accordance with the present disclosure will be described with reference to the drawings, in which:

FIGS. 19(A)-(B) illustrate embodiments of a second prefix.

DETAILED DESCRIPTION

Figure 1:
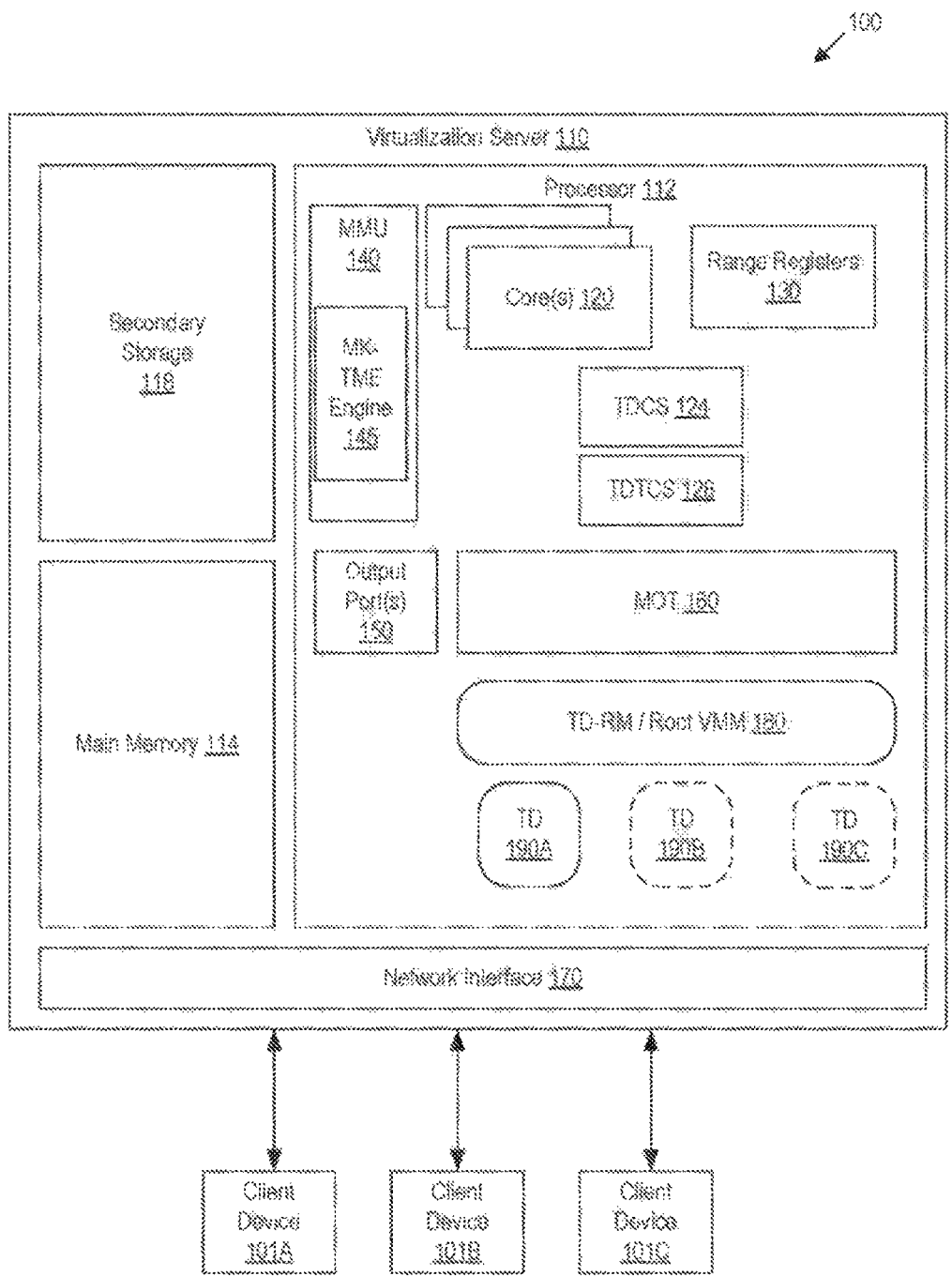
FIG. 1 is a schematic block diagram of a computing system 100 that provides isolation in virtualized systems using TDs, according to an implementation of the disclosure.

The present disclosure relates to methods, apparatus, systems, and non-transitory computer-readable storage media for at least protecting against replay attacks. To defend against the type of attacks mentioned in the background, a direct solution is to build a replay protection tree on memory. However, this incurs a large performance cost as with each read and write access the replay tree needs to be verified/updated to ensure that the data being read from to be verified/updated to ensure that the data being read from memory is what the processor wrote previously. The worst-case overheads for such a solution can go up to 7× with an average of 3× in a 16 thread system (from performance model with server workloads). This is often unacceptable in a practical use case scenario.

With un-protected address bus, along with increasing the ease with which an active adversary can conduct a hardware replay attack, a passive attacker can silently observe the address bus gaining information about access patterns which has been shown to result in information leakage under some scenarios. To prevent access pattern disclosure, Oblivious RAM (ORAM) could be used which randomizes the DRAM location of a particular line/address/block each time it is read or written. However, doing this results in steep performance/bandwidth costs, with state-of-the-art ORAM design resulting in at least 5-10× overheads for typical memory sizes.

Detailed herein are embodiments utilizing a cryptographically authenticated address bus (CAAB) protection that uses an intelligent memory design to prevent attacks on the address bus without detection and eliminate the memory bus as an observability surface for an attacker to do access pattern analysis. Embodiments detailed herein describe an intelligent memory module which has cryptographic capabilities. In some embodiments, a memory controller and an intelligent memory module exchange a key and using this key, the address (on the address bus) is encrypted and integrity protected using authenticated counter mode encryption. The memory controller on receiving a read or a write request encrypts the address (e.g., using pre-generated encrypted counters to minimize cryptographic overheads). A message authentication code (MAC) also gets generated along with the encrypted address to be able to detect modification to the encrypted address.

To send the MAC, in some embodiments, a cycle on the memory bus is "taken" to send the MAC only. A microcontroller, implementing the intelligence for memory, is to decrypt the address and verify its integrity (after receiving corresponding MAC) and before serving the read or write command. Any modification on the address bus will be detected as an integrity failure.

In some embodiments, randomized replay trees (RR-Trees) are deployed (sometimes in conjunction with CAAB) to detect hardware replay attacks where the hardware attacker modifies the memory contents directly by recording and replaying the MAC. RR-Trees introduce the notion of randomized replay verification where the replay tree is kept up-to-date by updating the tree on each write to protected memory but reads from protected memory are verified randomly using one of the several methods outlined below. RR-Trees add a non-determinism to replay attacks on memory as the same address may be verified against the replay tree on one access and not verified on a different access to the same address. In most secure settings, the RR-trees are set to do verification on each read. In some embodiments, the frequency of verification is selectable. Which allows for RR-Tree usage that offers a tunable balance between security and performance while making all replay attacks on memory non-deterministic.

As contemplated in the present disclosure, embodiments include a processor security capability called Trusted Domain Extensions (TDX) to meet increased security objectives via the use of memory encryption and integrity via memory controller engines. As used in TDX, a Trusted Domain (TD) is a protected VM.

Embodiments comprise an additional extended page table (EPT) structure called a Secure Extended Page Table (SEPT) that is used by a processor for TD private page walks. The SEPT is a per-TD EPT (i.e., each TD has its own SEPT) that is managed by a Trusted Domain Resource Manager (TDRM) only via special instructions newly added to the instruction set architecture (ISA) of the processor. The TDRM cannot alter SEPT without using these instructions otherwise an integrity failure will be reported by the processor. In other embodiments, all or parts of the SEPT may be access-controlled using processor range-register protection.

In typical VM implementations, the processor supports one EPT pointer (EPTP) per virtual memory control structure (VMCS). The VMCS is a data structure in memory that exists once per VM, while the VM is managed by the VMM. With every change of the execution context between different VMs, the VMCS is restored for the current VM, thereby defining the state of the VM's virtual processor. The VMM manages the EPT referenced by the EPTP. In embodiments, the VMs may be encapsulated by TDs, and the VMCS may be replaced by an analogous control structure called the Trusted Domain Control Structure (TDCS) that manages the guest state of TDs.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the processors per TD, and other integrity and replay controls on memory. Software executing in a TD operates with reduced privileges so that the TDRM can retain control of platform resources. However, the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset subsystems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements.

FIG. 1 is a schematic block diagram of a computing system 100 that provides isolation in virtualized systems using TDs, according to an implementation of the disclosure. The virtualization system 100 includes a virtualization server 110 that supports a number of client devices 101A-101 C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 101A-101 C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Processor 112 may include one or more cores 120 (also referred to as processing cores 120), range registers 130, a memory management unit (MMU) 140, and output port(s) 150. TDRM 180 communicates with a MOT 160 and one or more trust domain control structure(s) (TDCS(s)) 124 and trust domain thread control structure(s) (TDTCS(s)) 128. TDTCS and TD-TCS may be used interchangeable herein. Processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, processor 112 may be used in a SoC system.

The computing system 100 is representative of processing systems based on micro-processing devices available from Intel Corporation of Santa Clara, Calif., although other systems (including PCs having other micro-processing devices, engineering workstations, set-top boxes and the like) may also be used. In one implementation, sample system 100 executes a version of the WINDOWS' operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by MMU 140.

The core 120 may execute the MMU 140 to load pages from the secondary storage 118 into the main memory 114 (which includes a volatile memory and/or a nonvolatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory and provide parameters for a protocol that allows the core 120 to read, walk and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TD architecture can include 1) memory encryption via MK-TME engine (memory encryption engine (MEE)) 145, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MKTME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software. The MK-TME engine 145 may include storage for the one or more keys. In some embodiments, there is at least one fuse keys on die.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however, the TDRM cannot affect the confidentiality or integrity of the TD 190A-190C under defined circumstances. Further details of the TD architecture and TDX are described in more detail below.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) micro-processing device, a reduced instruction set computing (RISC) micro-processing device, a very long instruction word (VLIW) micro-processing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random-access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

Figure 2:
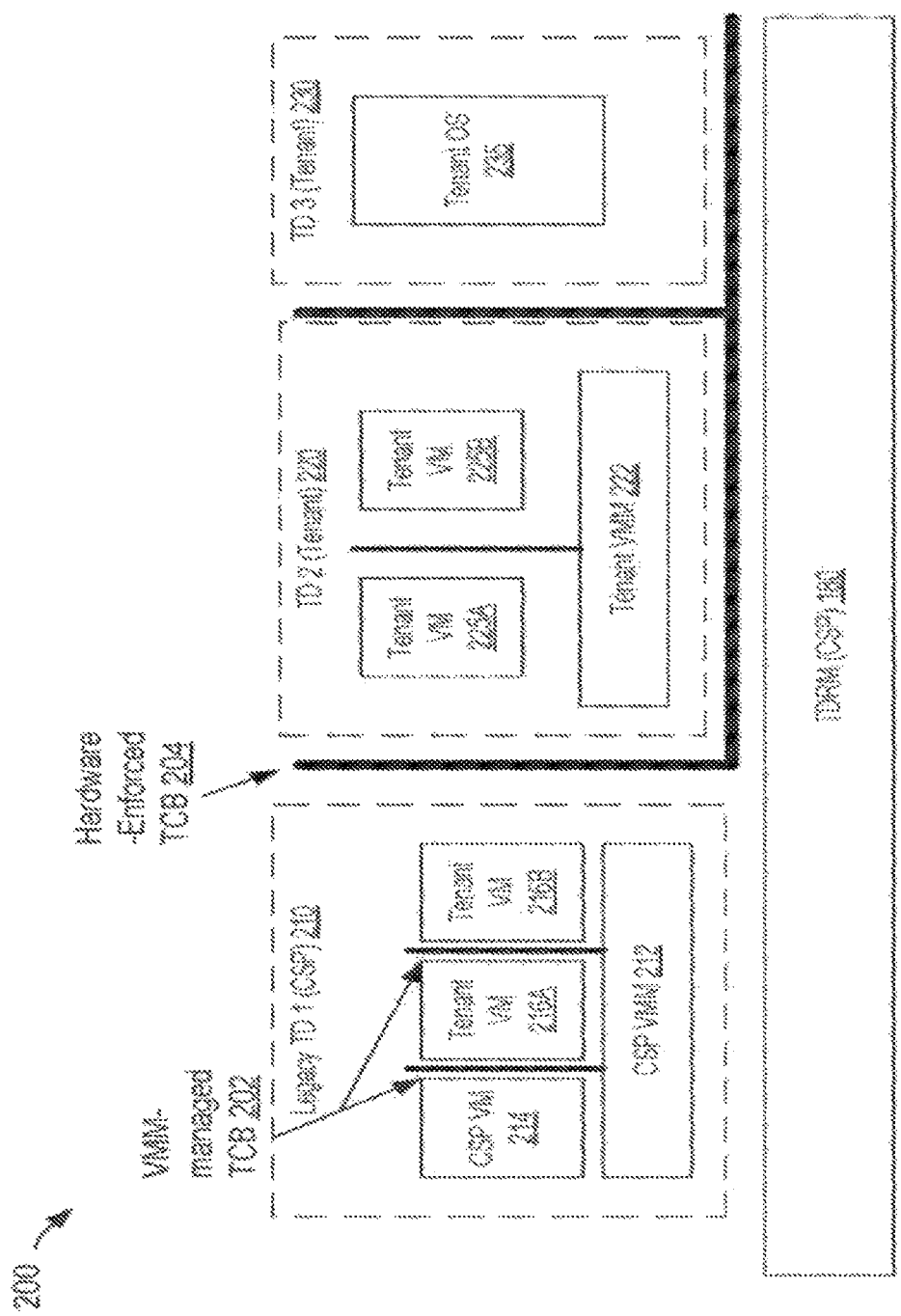
FIG. 2 is a block diagram depicting an example computing system implementing TD architecture according to some embodiments.

FIG. 2 is a block diagram depicting an example computing system implementing TD architecture 200 according to some embodiments. The TD architecture 200 supports two types of TDs. A first type of TD is a TD where the tenant trusts the CSP to enforce confidentiality and does not implement the TD architecture of implementations of the disclosure. This type of legacy TD is depicted as TD 1210. TD 1210 is a CSP TD having a CSP VMM-managed TCB 202. TD 1210 may include a CSP VMM 212 managing a CSP VM 214 and/or one or more tenant VMs 216A, 216B. In this case, the tenant VMs 216A, 216B are managed by the CSP VMM 212 that is in the VM's 216A, 216B TCB 202. In implementations of the disclosure, the tenant VMs 216A, 216B may still leverage memory encryption via TME or MK-TME in this model (described further below).

The other type of TD is a TD is a TD where the tenant does not trust the CSP to enforce confidentiality and thus relies on the CPU with TD architecture of implementations of the disclosure. This type of TD is shown in two variants as TD2 220 and TD3 230. The TD2 220 is shown with a virtualization mode (such as VMX) being utilized by the tenant VMM (non-root) 222 running in TD2 220 to managed tenant VMs 225A, 225B. The TD3 230 does not include software using a virtualization mode, but instead runs an enlightened OS 235 in the TD3 230 directly. TD2 220 and TD3 230 are tenant TDs having a hardware enforced TCB 311 as described in implementations of the disclosure. In one implementation, TD2 220 or TD3 230 may be the same as TD 190A described with respect to FIGS. 1A and/or 1B.

The TDRM 180 manages the life cycle of all three types of TDs 210, 220, 230, including allocation of resources. However, the TDRM 180 is not in the TCB for TD types TD2 220 and TD3 230. The TD architecture 200 does not place any architectural restrictions on the number or mix of TDs active on a system. However, software and certain hardware limitations in a specific implementation may limit the number of TDs running concurrently on a system due to other constraints.

Figure 3:
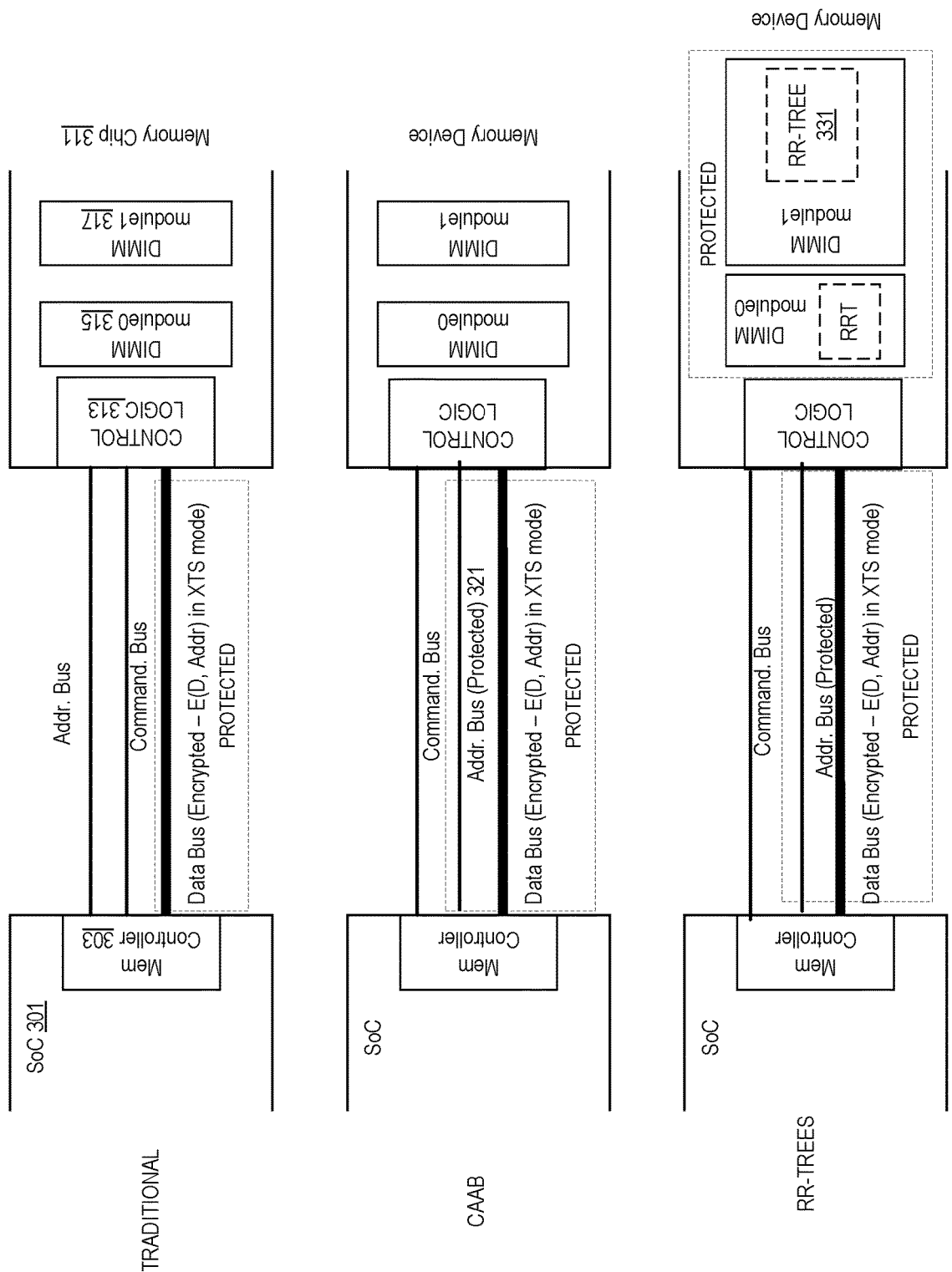
FIG. 3 illustrates various embodiments of system on a chip (SoC) or processor interactions with memory.

FIG. 3 illustrates various embodiments of system on a chip (SoC) or processor interactions with memory. The top illustration shows a portion of a SoC 301 (or processor) and its interaction with a memory chip 311. As shown, a memory controller 303 (e.g., MMU 140) communicates with a memory device 311 (such as random-access memory). The memory controller 303 causes a read or a write in one of the DIMM modules 315 and 317. Control logic 313 is responsible for making those reads and/or writes. Reads and writes utilizes at least an address bus (having the address of data to write or receive) and a data bus (which, in some embodiments, in encrypted for example by using an XTS mode of encryption of data with address-based tweaks). Additionally, a command bus may be used to indicate a read, write, etc. In this top portion, at most the data bus is protected. Commands and/or addresses can be manipulated.

The middle illustration shows a portion of the SoC (or processor) and its interaction with a memory chip using CAAB (note that numbers are not repeated so there is no confusion as to which embodiment is indicated). As shown, the address bus is protected along with the data bus. This protection may come in multiple forms. In some embodiments, the address bus is encrypted using AES-GCM counter mode authenticated encryption with an associated GHASH (MAC) generated for tamper resistance. With this scheme, an address is encrypted differently (with no correlation amongst corresponding ciphers) each time it is sent for read or write to memory. This prevents any knowledge of what addresses are present on bus and/or when a particular address is sent in a memory request (from a passive physical adversary perspective). The associated GHASH detects any address tamper to flip bits. To prevent latency hits on the critical path, in some embodiments, encrypted counter streams (e.g., with 96-bit counters) are pre-generated and the final operation once the read/write request arrives is only a bitwise XOR operation with address with associated truncation.

In some embodiments, CAAB only integrity protects the address bus. With this scheme, the security guarantees are weaker, but could be enough to satisfy the threat model/requirements in different use cases. The hardware complexity is lower at almost the same minimal latency overheads as the abovementioned. In this embodiment, a MAC (e.g., GMAC/HMAC) is generated for the address value and sent as part of a special next cycle on the memory bus. This does detect any address bit flips preventing replay attacks due to dropped or misdirected writes. However, it does not protect against memory access pattern leakage and knowledge of when a particular address is sent as part of a memory request.

The lower illustration shows a portion of the SoC (or processor) and its interaction with a memory chip using RR-Trees (note that numbers are not repeated so there is no confusion as to which embodiment is indicated). Note that CAAB could be used (and is in this illustration) but is not required in some embodiments. CAAB address bus protection provides an efficient solution for simple hardware replay attacks that can be done using single bit flips on an address bus and obfuscates the access pattern on the address bus as well. RR-trees help prevent replay attacks on protected memory where the attacker directly manipulates memory contents. As an example, the attacker can record data line and associated MAC at a particular location and replay the line and MAC at a later point in time. Such attacks require much greater degree of complexity than the simple bit flips on address bus which achieve the same end result and are protected by CAAB and hence are likely to be of interest in very secure settings. One or more of the DIMM modules of the memory device store a RR-Tree (or RRT) 331. RR-Tree usage involves keeping the replay tree up to date by updating it on each write, but having the control logic verifying it only probabilistically or randomly based on some function. Since writes are off the performance critical path, the additional latency and bandwidth incurred during writes to keep the replay tree updated does not result in any significant performance loss. Additionally, since verification is done only randomly, the performance overheads are directly dictated by the frequency of verifications.

Figure 4:
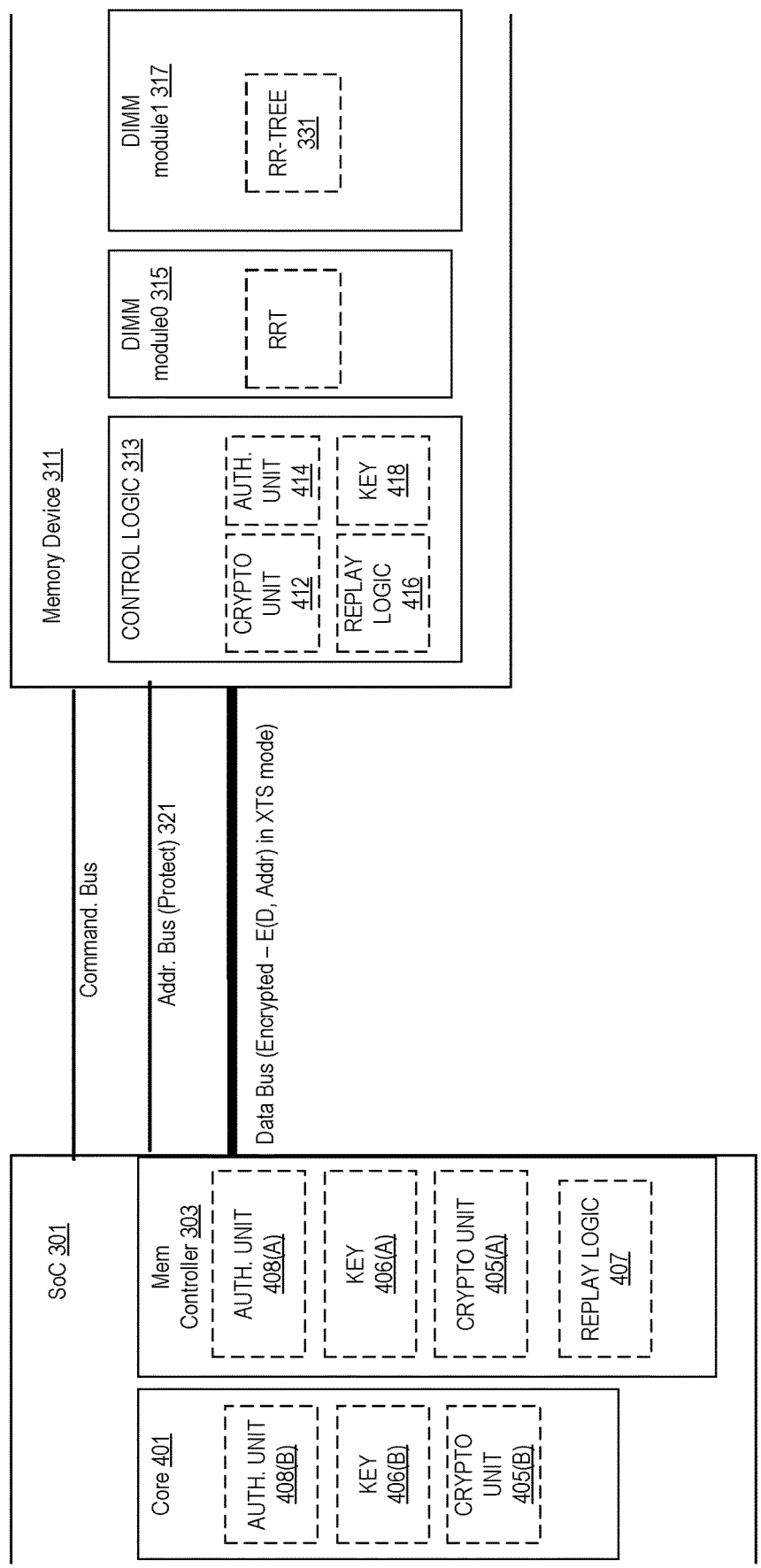
FIG. 4 illustrates embodiments that utilize CAAB and/or RR-Trees in more detail.

FIG. 4 illustrates embodiments that utilize CAAB and/or RR-Trees in more detail. Note that the number for components shown in FIG. 3 is maintained. In particular, aspects of the memory controller 303 and control logic 313 are shown in greater detail.

To support CAAB, either the memory controller 303 includes one or more of a cryptography circuit unit 405(A), authentication circuitry unit 406(A), and storage for a key 406(A), and/or a core 401 includes one or more of a cryptography circuit unit 405(B), authentication circuitry unit 406(B) and storage for a key 406(B). The cryptographic unit 405 implements, in some embodiments, one or more cryptographic algorithms, such as an Advanced Encryption Standard (AES) algorithm in electronic-codebook (ECB), Galois-counter-mode (GCM), and/or cipher-block-chaining (CBC) mode. The cryptographic unit 405 is used to encrypt the data and/or address bus.

Authentication circuitry unit 406 implements, in some embodiments, one or more hashing algorithms (e.g., a Secure Hash Algorithm (SHA), a Galois hash (GHASH) algorithm, etc.), generates a message authentication code (MAC), authentication tag, or other data that may be used to authenticate or verify the integrity of the handle, and/or performs any other authentication function to provide for authentication in addition to encryption as a protection mechanism.

For cryptographic protection of addresses on the memory address bus, the corresponding entities (i.e., the memory controller 303 and control logic 313) need to share a key used in encryption/decryption (e.g., 128-bit or 256-bit key) which they store in key storage 406 and 418.

There are multiple options to provision these keys. In some embodiments, there is a key exchange at boot. For example, at boot phase, the memory controller 303 and the control logic 313 exchange a key based on an authenticated Diffie-Hellman protocol. To achieve this, both entities need to have a public-private key pair. The private key would be fused in on the corresponding component manufacture (delayering H/W reverse-engineering attacks out of scope) and the certificate (or certificate chain) holding the public key is provisioned into the component as well during component validation. For the memory controller 303, the underlying core provisioned certifications and private key combination are re-purposed for this exchange in some embodiments. Before initiating the key exchange with corresponding memory module, the memory controller 303 obtains the necessary information from the core 401 via secure side band communication mechanisms in some embodiments.

Figure 5:
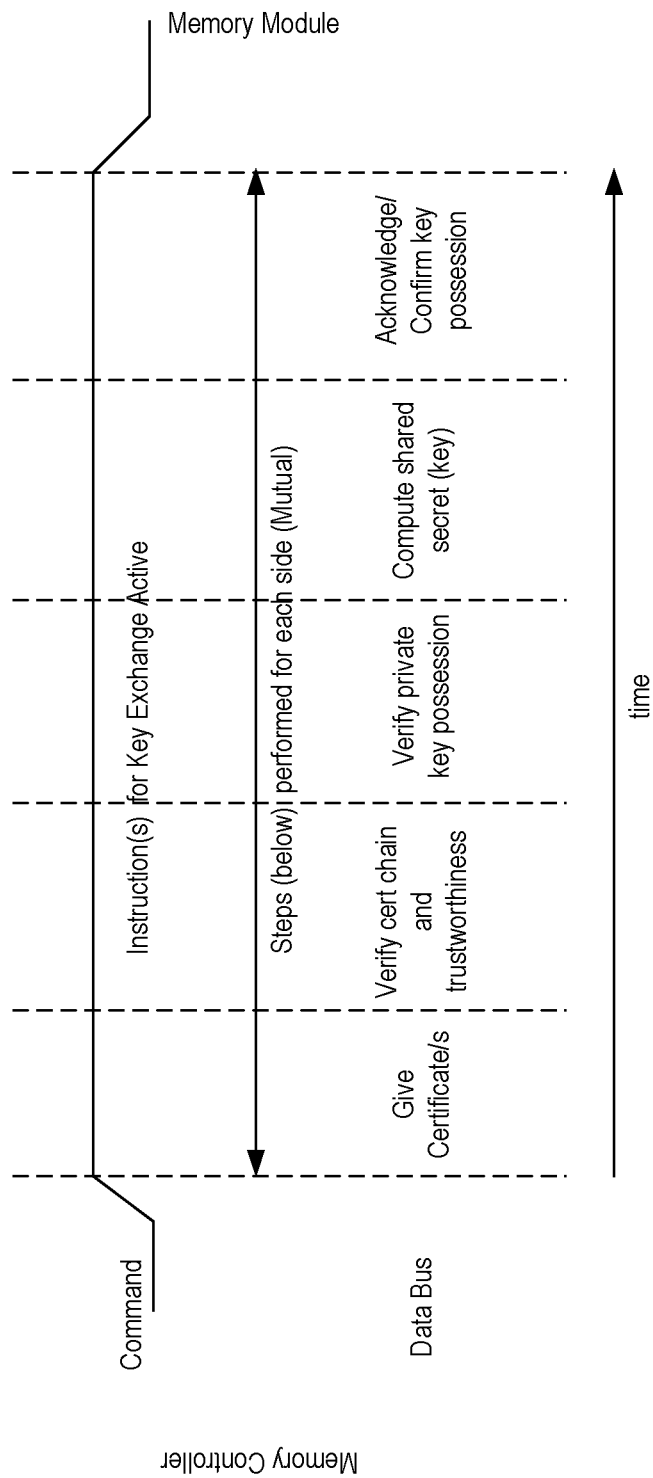
FIG. 5 illustrates embodiments of the authenticated Diffie-Hellman protocol key exchange.

For the authenticated Diffie-Hellman protocol, the actual key exchange messages would occur over special cycles over the memory bus at boot phase. FIG. 5 illustrates embodiments of the authenticated Diffie-Hellman protocol key exchange. A control/command signifies "key exchange active messages" that are understood by both the memory controller and the intelligent memory module (control logic 313). The actual messages involving sending public keys, nonce/challenges, acknowledgements, etc. are performed over the data bus. The actual algorithm steps can be performed in hardware logic or in firmware in microcontrollers inside the two entities. When a microcontroller is used, any existing microcontroller inside these modules for control path operations (like refresh control in memory chips) can be re-purposed for key exchange as well. The signed certificate or certificate chain would be used for mutual authentication and attestation based on the trustworthiness of the chain that has signed it. At the end of the exchange, both the memory controller and the memory module would have a shared key that can be used for address bus protection. At every boot, this key would be different.

In some embodiments, a static key configuration at manufacturing/system integration is used. In some embodiments, especially in closed systems where memory controller and memory are manufactured or at least assembled by the same vendor, to avoid the hardware and/or firmware changes in the components as well as any changes in the memory bus protocols for the key exchange described above, the shared key may be pre-programmed earlier in the life cycle in the two components. Complications arise in the process as the memory controller is owned by the CPU/SoC manufacturer and the memory modules by the memory manufacturer, which are typically two separate entities. In some embodiments, at manufacturing time, a common system integrator takes both CPU and memory chips from the respective manufacturers to build systems, and for these units, using cryptographic and/or secure regulatory protocols, keys would be shared between the two owning entities. They would be provisioned securely in the respective component fuses and them being sold to the system integrator. In some embodiments, a system integrator program the shared key on the components. This would remain over the entire life cycle of the components.

Corresponding to each read and write request arriving at the memory controller 303 from either the core 401 or IO sub-system, the physical address value (e.g., 64-bit value) is encrypted and integrity protected at the memory controller 303 before sending the request out on the address bus. In some embodiments, AES-GCM authenticated encryption is performed with a corresponding GHASH using one or more of the cryptographic unit 405 and authentication unit 408. At every hardware reset, the corresponding linear feedback shift register (LFSR)/counter (96-bit) is reset. An initialization vector (randomly generated per boot) is used to generate the input value to a cipher block. With a pipelined AES design, an encrypted counter pad (128-bit) can be generated per cycle of the memory controller clock. With memory read and write requests typically not arriving every memory controller cycle, such encrypted counter streams could be pre-generated and stored in a buffer. Depending on the maximum burst size of read/write requests arriving at the memory controller 303 at any time, the number of pre-generated encrypted counters and thereby buffer depth is set. In some embodiments, the authentication unit 408(A), cryptographic unit 405, etc. are part of the MK-TME engine 145.

Hence, when any read or write request comes into the memory controller 303, the 64-bit encrypted address value is obtained by a XOR operation of the address with the next pre-generated counter pad (with corresponding 64-bit counter/cipher truncation). The GHASH calculation (for example, involving a 128-bit cipher and 2 Galois field multiplications) would also incur minimal additional latency. Depending on threat model, the command/control bus value (read/write, length etc.) can be used as "Authenticated Data" in the input to GHASH calculation. The final GHASH would be truncated to a bit value the same size as the address (e.g., 64-bit MAC for 64-bit address) to be sent for integrity protection.

For sending the request to memory, the encrypted address is sent out with the corresponding data. The address MAC (GHASH) is sent on the next bus cycle with a command/control opcode signifying MAC transport. The MAC can be sent over the address bus (or the data bus), In some embodiments, the memory controller 303 maintains a scoreboard of the requests sent, but not verified, and, when there is a read request received to one of the unverified requests, the read request is buffered in the memory controller until the verification completes. If the verification does not complete successfully, a security exception is raised, and specific actions can be taken.

Figure 6:
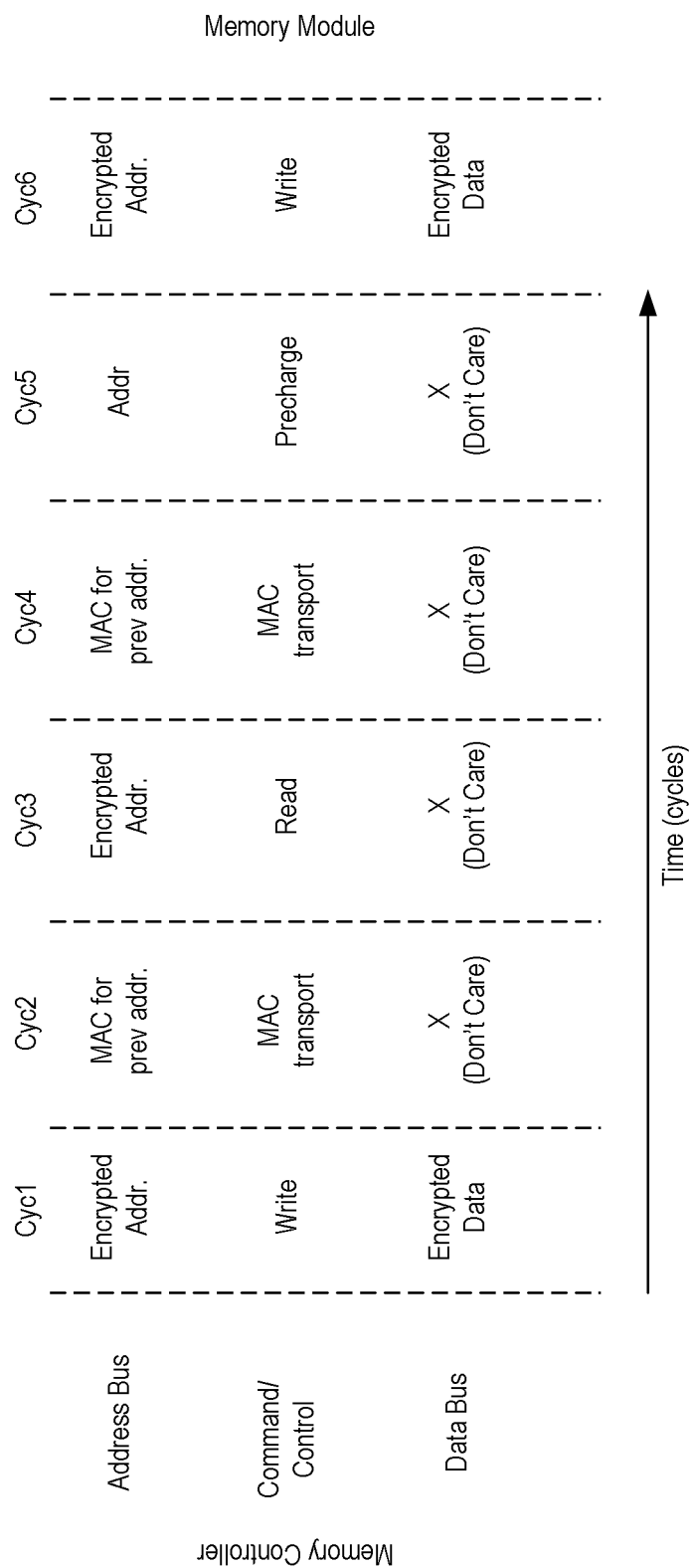
FIG. 6 illustrates embodiments of bus usage using CAAB.

FIG. 6 illustrates embodiments of bus usage using CAAB. As shown, after each encrypted address, the next cycle the MAC for that address is sent using a MAC transport command. Note the data bus could have also been used. Similarly, after each encrypted read address, the MAC is sent.

The other primary component in this secure communication is the memory device 311 corresponding to the memory channel. Similar to the memory controller 303, encrypted counter streams can be pre-generated and stored inside the memory device 311 to prevent bottlenecks.

To reduce the MAC bandwidth overheads, instead of the address MAC being sent for every read or write access, in some embodiments, a running MAC (of the address values) is calculated and tracked over multiple requests and sent over the bus once every 'X' accesses. The value of 'X' can be programmed in memory controller by BIOS or microcode at every platform boot via a model specific register (MSR). The memory device is also notified the value of X through dedicated communication via the memory controller.

Figure 7:
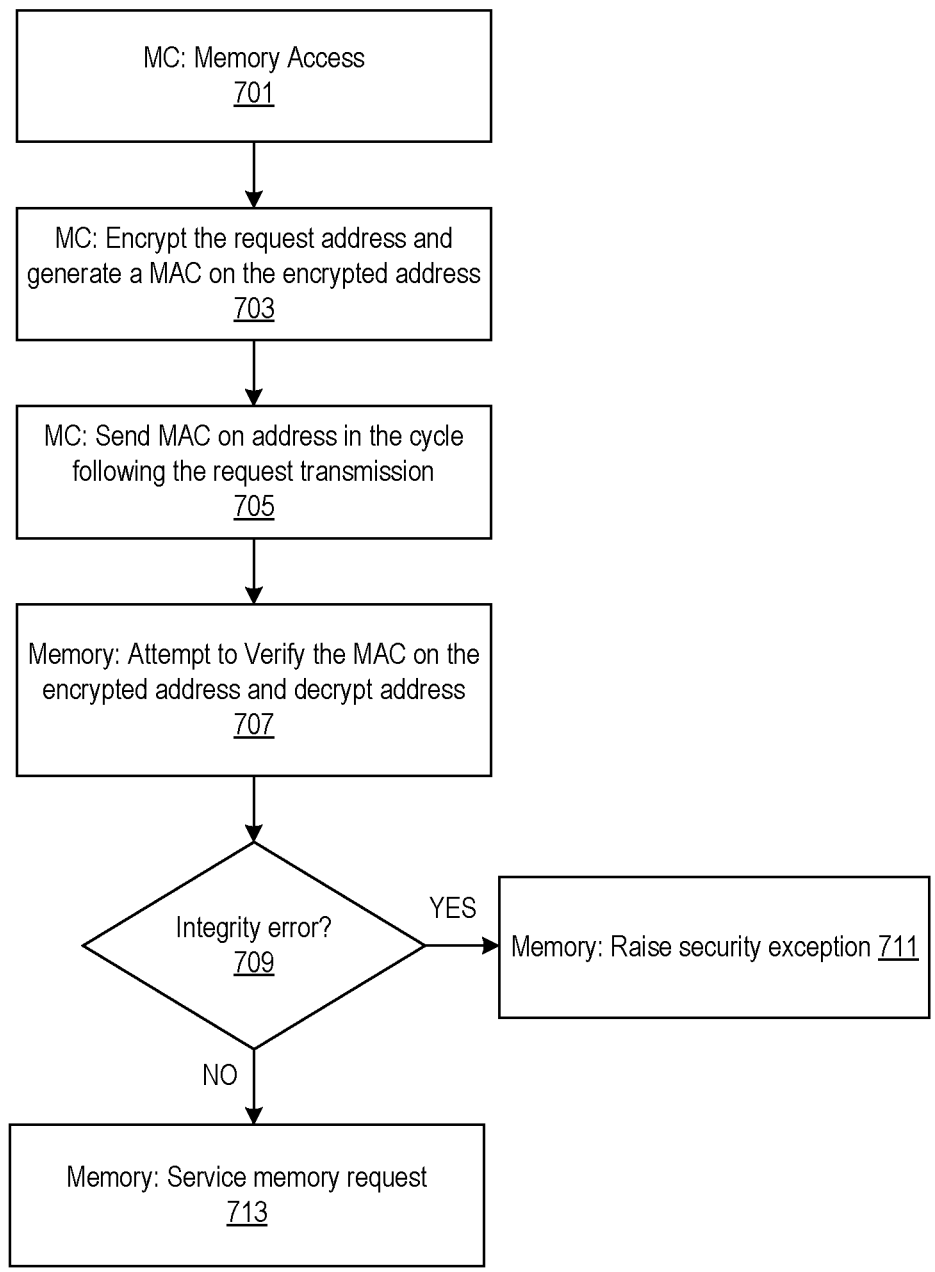
FIG. 7 illustrates embodiments of a method for using CAAB.

FIG. 7 illustrates embodiments of a method for using CAAB. At 701, the memory controller receives a memory access request. For example, a read or write request. Regardless of the type of request, the request includes an address.

The memory controller encrypts the address of the request (as discussed above) and generates a MAC on the encrypted request at 703. Note that in some embodiments, the MAC is calculated for addresses only for writes. As writes are much less frequent compared to reads for typical programs, this would significantly reduce bandwidth hits for MAC transport. With only writes, the computation pressure for number of pre-generated counter streams is likely to lower as well.

The memory controller then sends the request in a first cycle and the MAC on a subsequent cycle at 705.

The receiving memory device attempts to verify the received MAC at 707. In some embodiments, this verification is performed by the generation of a MAC (GHASH) by the memory device on the received encrypted address. The address is also decrypted. In some embodiments, the address value is decrypted via a XOR operation with a next valid counter pad in a sequence.

A determination of if the MACs match (and the request is therefore verified as not having an integrity issue) is made at 709. Only if the MACs match, the request is served to/from memory. As an optimization, in some embodiments, to mask the MAC generation and comparison, a bank row select operation (and/or row buffer compare) can already be in progress once the address is decrypted.

When the MAC check fails, it signifies that one or more address bits were changed while in transit through the memory bus and a security exception is raised at 711. For a read request, poison is set in the response from the memory module signifying address bus modification. For a write request with address bus check failure, the key is marked invalid or poisoned, corresponding (and future) writes dropped. and all further read request responses are sent back with above poison (with additional signal for indicating past address bus tamper). This is done because on writes, tampered addresses indicate dropped or mis-directed writes and the next request in order may be a read request to the same original address, reading a stale value and thereby a successful hardware replay. This is achieved, ins some embodiments, by having the memory device 311 send back to the memory controller via a special cycle, the indication that address bus tampered in write request and no further requests being served. The memory controller 303 on receiving this special cycle would log a special error code, make a key invalid, and optionally raise a machine check exception to inform software of the tampering.

When the MAC check succeeds, the memory request is serviced at 713.

In some embodiments, to give users the flexibility to intelligently obtain security at the cost of performance and vice versa, through compiler support, programs can enumerate new load/store instruction types with specific prefixes or opcodes. These load/stores indicate that if the corresponding operations is/are going to memory to fetch/write, the address bus has to be protected. These could be load/stores of a secure critical region of memory or a sandboxed region of process memory that the program wants to secure. A signal is carried through cache sub-system and then through caching home agent to the memory controller indicating that these read/write requests desire for address bus protection. The memory controller would protect the address buses of these requests via the schemes mentioned before. To remove effect on memory bandwidth of other programs, the MAC would be inserted only in special cycles in memory bus which are free (no pending normal read/writes at the channel in those cycles) within some normal arbitration/QoS threshold. A signal on memory bus is set to indicate whether a read/write will be followed by its MAC or not. As such, memory modules would decide to buffer requests accordingly to prevent read/write without verification.

With CAAB address bus protection disclosed above, an efficient solution for simple hardware replay attacks that can be done using single bit flips on address bus and obfuscate the access pattern on the address bus as well. While this in itself presents an advancement, RR-trees may be used to prevent replay attacks on protected memory where the attacker directly manipulates memory contents. As an example, the attacker can record data line and associated MAC at a particular location and replay the line and MAC at a later point in time. Such attacks require much greater degree of complexity than the simple bit flips on address bus which achieve the same end result and are protected by CAAB and hence are likely to be of interest in very secure settings. The current solution requires building a tree of metadata over the protected memory and walking the tree along the tree branch to verify data read from memory for freshness.

Figure 8:
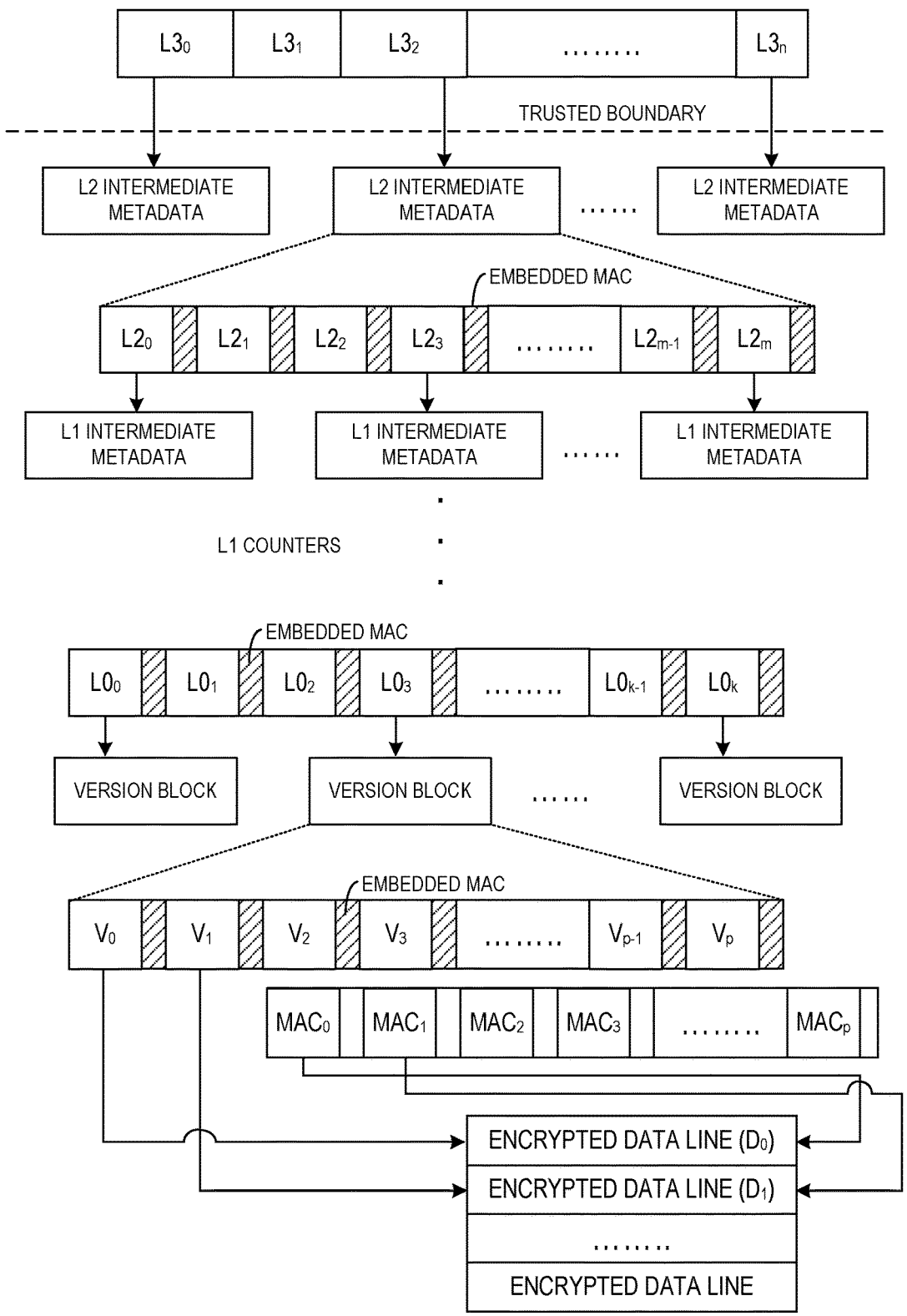
FIG. 8 illustrates embodiments of an exemplary RR-Tree.

FIG. 8 illustrates embodiments of an exemplary RR-Tree. I some embodiments, a root of the RR-tree is stored on-die and forms the root of trust (i.e., a trust boundary). The versions of the cachelines (CLs) are part of this counter tree structure. Alternatively, other protection mechanisms may be used for replay-protection. For example, Message Authentication Codes (MACs) associated with the secure CLs can be stored on-die. An advantage of storing on-die MACs associated with the secure CLs is to increase a security of the computing system and safeguard against hardware and software attacks. For example, when the MACS associated with the secure CLs are stored on-die, a successful replay attack would need to replay both the CL and its associated MAC. In an example, the tree is built on top of the VER associated with the protected CLs. In this example, the tree built on top of the VERs can reduce a size of each level compared to the previous level.

In some embodiments, the memory 311 stores at least encrypted CLs and security metadata. The security metadata includes VER and MAC CL and L0 to Ln−1 counters. In certain implementations, for each data line moved to external memory 311, the MAC value associated with it is stored. When the data line is read from external memory 311, its integrity may be verified by calculating the MAC value of the data line and comparing a calculated MAC value with the stored MAC value. Replay protection may be further provided by storing the version (VER) of the data line that is incremented each time when the data line is written back to the external memory. In certain implementations, the SoC 301 may further comprise a cache that may be employed to transparently store copies of the most recently accessed MAC and VER lines such that future requests for those MAC and VER lines may be satisfied more efficiently.

For example, the MEE 145 performs counter mode encryption using an encryption seed that is unique for each CL. The encryption seed is a set of encryption parameters stored in protected memory used by the MEE 145 to encrypt or decrypt CLs. In one example, the encryption parameters include multiple unique encryption keys and a counter. The counter is incremented to provide a unique seed for encryption key for different CLs or cryptographic cache blocks (CCBs) in memory. The CCB is a set of CLs. In one example, the MEE 145 can use the encryption seed for counter mode encryption. In another example, the MEE 145 can use the encryption seed for counter mode decryption. In one embodiment, the encryption seed associated with each portion of data written to the main memory is unique. For example, an encryption key is used to encrypt an encryption seed. In this example, each time data is written to the main memory, the encryption seed is different, and the data will be uniquely encrypted. When two data portions are the same data, each of the two data portions are uniquely encrypted when they are written to the main memory.

In another example, the encryption parameters include a spatial parameter and a temporal parameter. The spatially unique parameter can be a parameter that uses a physical address of the CL or the CCB to be accessed. The temporally unique parameter can be a parameter that uses a counter that serves as a version (VER) of the CL. For example, the spatial parameter is the physical location of the CL and the temporal parameter is the VER that iterate through a series of numbers based on the physical location of the CL. The VER is associated with each CL or CCB in the main memory. In one embodiment, the series of numbers can be incremented with each write to memory. For example, a MEE can use a counter that counts up with each write to memory to iterate through the series of numbers. In another embodiment, the series of numbers generated using the encryption seed can be a series of pseudo random numbers used to encrypt or decrypt data. In this example, the encryption seed is an input to an iterative function for encryption and decryption that iterates through the temporally and spatially unique parameters to different CLs.

The VER can be large enough to avoid overflowing to ensure that the same VER is not re-used. For example, the VER can be a 56-bit (b) counter. One advantage of the spatial and temporal uniqueness is that when the same data is written to memory at different locations, each data entry is encrypted to a different ciphertext. Additionally, integrity is afforded by associating a message authentication code (MAC) with each CL to ensure that while the data is resident in memory, the data cannot be modified without detection. In one example, the cryptographic MAC is 56 bits in length to provide sufficient security strength.

As shown, an exemplary counter tree (RR-tree) may include VER and MAC CL, metadata nodes L0, L1 and L2, and top-level (e.g., L3) counters. Each MAC may be associated with an encrypted CL. When the encrypted CL is written back to the memory 311, the MAC may be updated to reflect a measurement of the contents of encrypted CL currently being stored in the memory 311. When the encrypted CL is later read from memory, the contents of encrypted CL may be verified to determine it has not been edited since last loaded using the MAC. Authentication utilizing MAC protects against modification attacks on encrypted CL while in memory 311 to ensure data integrity.

VER is counter value-based "version" of encrypted CL determined when encrypted CL was last stored in the memory 311. VER may be incremented each time encrypted CL is written back to memory. Metadata nodes L0, L1 and L2 may comprise both counters and an embedded MAC (eMAC) computed based on the values of the counters. The eMACs may be formulated using a counter from the next higher level in the tree as an input. This may continue to the root or top-level L3 counters, which may be stored securely in the processing device.

L3 counters may not be evicted from the processing device and may be protected against attacks. The counter in each node L3, L2, L1 and L0 may act as a version for a following level ending with VER or MAC CLs storing VER corresponding to encrypted CLs. When encrypted CL is written, all of the counters corresponding to encrypted CL (including L3 counter and VER) are updated. The eMACs in each node are also updated since eMACs are computed using the values of all counters in the node. To ensure replay-protection, when loaded from memory 311 encrypted CL may be authenticated based on a MAC, which is formulated utilizing VER. VER may be authenticated based on counters in nodes L0, L1 and L2 up to L3 counter. A mismatch may indicate a potential attack and may raise a security exception to defeat the potential attack.

Figure 9:
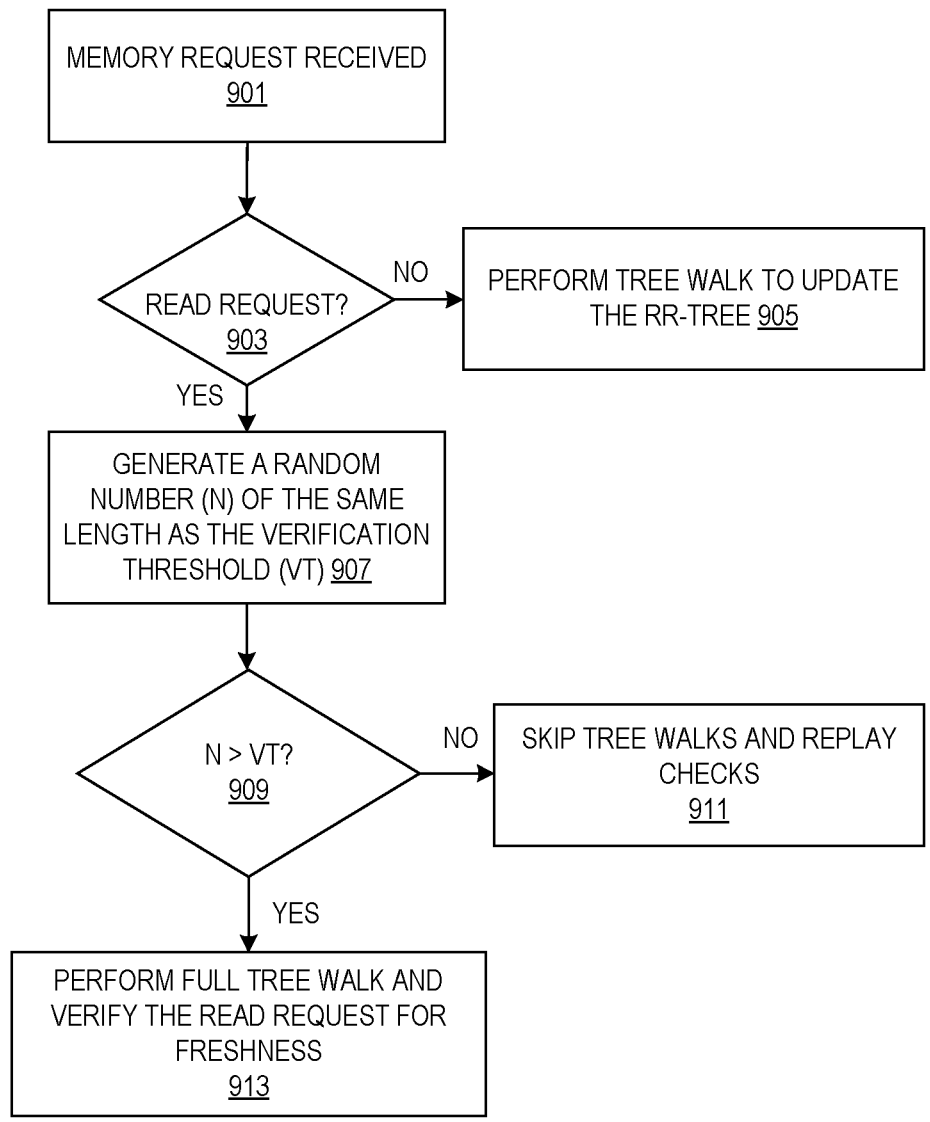
FIG. 9 illustrates embodiments of a method for using RR-Trees.

As shown in FIG. 4, one or more of the control logic 313 and the memory controller 303 includes replay logic 416 or 407 which is responsible for maintaining the RR-trees. FIG. 9 illustrates embodiments of a method for using RR-Trees.

At 901 a memory request is received. This request may be a read or a write request and at least includes an address. This request is received by replay logic 416 or 407.

A determination of the type of request is made at 903. For write requests, the RR-Tree is walked to update it at 905. Embodiment of such as walk are detailed herein. In some embodiment, when data is being encrypted and stored in the memory (e.g., as encrypted CL), each node in the replay tree are incremented. For example, all of the counters for each node are incremented. In another embodiment, for SoC-based cache, the tree walk can stop without climbing to L3 and without incrementing all of the associated replay tree levels. In one example, for a read request, the tree walk can stop a tree level already exists in cache. In another example, for a write request, the tree walk may stop when a node is found in a modified state in the cache. In one example, each node L2, L1 and L0 in the cache may maintain a bit to indicate if it was written to by a previous request. The bit may be set to indicate that the copy of the node L2, L1 or L0 in cache has been modified. For example, the node L2, L1 or L0 can be modified by another encryption request. A cached node in modified state indicates that a previous write already updated the higher-level nodes in the tree and that the walk does not need to continue to higher levels to increment nodes. When modified nodes are evicted out of cache, the eMAC is re-computed to reflect the latest data being written back to memory. Each eMAC computation uses a counter value in the next higher level and computes the eMAC over the contents of the node corresponding to the eMAC.

When modified nodes in cache are accounted for, the nodes L2, L1 or L0 must be traversed until a determination is made that a node has been modified. Each node from L0 to L3 may be traversed looking for a version in cache that has been modified. In one example, when a node is not located in cache during the tree walk, the node may be loaded into cache from the memory. In each level traversal, the node is incremented. In another example, when a node is determined to be modified the tree walk stops after the modified node is incremented. When no modified nodes are found in cache, the tree walk may stop after incrementing counter in L3. When the CL is encrypted and written to the memory (e.g., as encrypted CL), eMACs can be recalculated. VER may be utilized to recalculate the eMACs. The VER can be used to encrypt the data as encrypted CL. Encrypted CL may then be stored in the memory.

When the request is a read request, in some embodiments, a random number (N) of the same length as a verification threshold is generated at 907. Typically, the verification threshold is a random value programmed by BIOS, OS, or microcode depending on the environment using the RR-tree. On each read request, the logic implementing the RR-Tree logic generates a random number. If the number generated is greater than the threshold programmed, only then is the verification of the incoming read request carried out, else the read request is simply decrypted and returned to the requestor. Using a randomized threshold makes the replay attacks on memory non-deterministic for an attacker. The same memory location that was not verified on one access can get verified in the next adding to the non-determinism. Note that, software can always choose the threshold to be zero. In this case, RR-trees will de-generate to the normal replay trees and perform verification on each read access. Software also has control over the frequency that the verification is done. A larger value of the threshold will indicate fewer verifications and likewise a smaller threshold would indicate larger verification frequency.

In some embodiments, the verification threshold is user configurable. In particular, a single instruction may be executed to set the verification threshold. An example of this is SETRPTHLD SRC instruction. Here the opcode (shown by opcode mnemonic) is to indicate that execution circuitry is to set a verification threshold that is indicated by the source (SRC) which may be a register storing the verification threshold, a memory location storing the verification threshold, and/or an immediate encoding the verification threshold. In some embodiments, the instruction is package scoped and hence software is expected to execute this instruction on each of the packages on the platform. The instruction programs the threshold on each of the memory encryption engines on the package (one per memory channel in most common implementations).

In some embodiments, the acts of 907 and 909 are not performed. Rather, the determination of whether or not to perform tree walking is determined in a different manner. Exemplary manners include, but are not limited to: using odd/even requests (where one of odd or even numbered requests are service), checking every X number of requests, checking a request after a set amount of time between requests has passed, etc.

When the generated number is not greater than the verification threshold, any tree walk or replay check is skipped at 911. The request is serviced.

When the generated number is not greater than the verification threshold, a full tree walk is performed, and the read request is verified for freshness at 913. In some embodiments, a tree walk can include loading L0, L1 and/or L2 into MEE cache for authenticating VER corresponding to encrypted CL. The tree walk may begin with MEE cache being checked to determine if VER is present. When VER and MAC CLs, L0, L1 or L2 is present in MEE cache, the node has already been authenticated. For example, the node was authenticated in a prior tree walk for encrypted CL, corresponding to another encrypted CL. When the node has already been authenticated the tree walk may stop.

In one embodiment, when VER already exists in MEE cache, then MAC may be verified using VER. In one example, when MAC is verified, the decryption of encrypted CL may proceed. In another example, when VER does not already exist in the MEE cache, then the tree walk may continue and the VER and MAC CLs may be authenticated. Authentication may include calculating a MAC over VER and MAC CLs and comparing the newly calculated MAC to VER and MAC eMAC. In one example, MAC resides in VER and MAC CLs and protects encrypted CL. In another example, VER and MAC eMAC protects VER and MAC CLs.

In one embodiment, the MAC for VER and MAC CLs can be calculated using a cryptographic process where an encrypted value may be generated based on the address of VER and MAC CLs. When the encrypted value is generated, the counter value of the counter in L0 node, an AES key, and MAC value is then generated by hashing the cryptographic value with all of the counter values in VER and MAC CLs. In one example, the VER and MAC CLs may be authentic when the MAC for VER and MAC CL matches VER and MAC eMAC. In another example, when the MAC does not match VER and MAC eMAC then a security exception may occur. A security exception includes any security-related operation that intervenes to prevent the security of electronic device from being compromised. For example, the security exception can halt MEE encryption and/or decryption operations for the encrypted CL, restrict access to a protected memory space in the memory 311, or notify other systems of the electronic device.

In one embodiment, when L0 counter value is used to calculate the MAC for VER and MAC CL, the MEE determines whether L0 was already loaded in MEE cache. When L0 was already in the cache, then L0 is verified and the tree walk may stop. When L0 is not already in the cache, L0 is verified. In one example, L0 is verified by calculating the MAC of L0 utilizing counter value from L1. When the newly calculated MAC value matches L0 eMAC, then L0 may be deemed authentic. When the newly computed MAC does not match L0 eMAC, then a security exception may occur.

Embodiments detailed above may be utilized in many different architectures and systems. Detailed below are examples of exemplary architectures, systems, processors, etc.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 10:
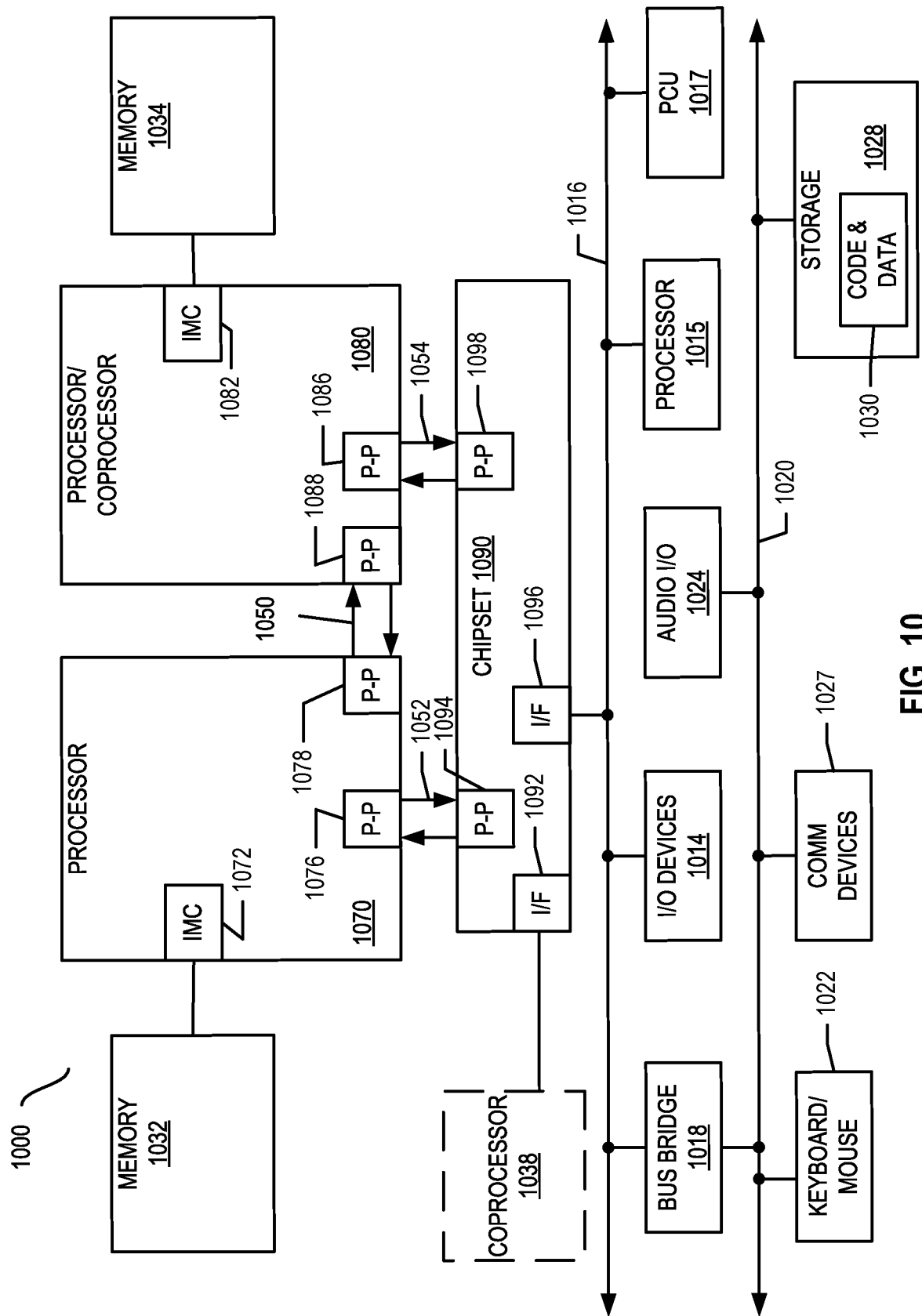
FIG. 10 illustrates embodiments of an exemplary system.

FIG. 10 illustrates embodiments of an exemplary system. Multiprocessor system 1000 is a point-to-point interconnect system and includes a plurality of processors including a first processor 1070 and a second processor 1080 coupled via a point-to-point interconnect 1050. In some embodiments, the first processor 1070 and the second processor 1080 are homogeneous. In some embodiments, first processor 1070 and the second processor 1080 are heterogenous.

Processors 1070 and 1080 are shown including integrated memory controller (IMC) units circuitry 1072 and 1082, respectively. Processor 1070 also includes as part of its interconnect controller units point-to-point (P-P) interfaces 1076 and 1078; similarly, second processor 1080 includes P-P interfaces 1086 and 1088. Processors 1070, 1080 may exchange information via the point-to-point (P-P) interconnect 1050 using P-P interface circuits 1078, 1088. IMCs 1072 and 1082 couple the processors 1070, 1080 to respective memories, namely a memory 1032 and a memory 1034, which may be portions of main memory locally attached to the respective processors.

Processors 1070, 1080 may each exchange information with a chipset 1090 via individual P-P interconnects 1052, 1054 using point to point interface circuits 1076, 1094, 1086, 1098. Chipset 1090 may optionally exchange information with a coprocessor 1038 via a high-performance interface 1092. In some embodiments, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor 1070, 1080 or outside of both processors, yet connected with the processors via P-P interconnect, such that either or both processors' local cache information may be stored in the shared cache if a processor is placed into a low power mode.

Chipset 1090 may be coupled to a first interconnect 1016 via an interface 1096. In some embodiments, first interconnect 1016 may be a Peripheral Component Interconnect (PCI) interconnect, or an interconnect such as a PCI Express interconnect or another I/O interconnect. In some embodiments, one of the interconnects couples to a power control unit (PCU) 1017, which may include circuitry, software, and/or firmware to perform power management operations with regard to the processors 1070, 1080 and/or co-processor 1038. PCU 1017 provides control information to a voltage regulator to cause the voltage regulator to generate the appropriate regulated voltage. PCU 1017 also provides control information to control the operating voltage generated. In various embodiments, PCU 1017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1017 is illustrated as being present as logic separate from the processor 1070 and/or processor 1080. In other cases, PCU 1017 may execute on a given one or more of cores (not shown) of processor 1070 or 1080. In some cases, PCU 1017 may be implemented as a microcontroller (dedicated or general-purpose) or other control logic configured to execute its own dedicated power management code, sometimes referred to as P-code. In yet other embodiments, power management operations to be performed by PCU 1017 may be implemented externally to a processor, such as by way of a separate power management integrated circuit (PMIC) or another component external to the processor. In yet other embodiments, power management operations to be performed by PCU 1017 may be implemented within BIOS or other system software.

Various I/O devices 1014 may be coupled to first interconnect 1016, along with an interconnect (bus) bridge 1018 which couples first interconnect 1016 to a second interconnect 1020. In some embodiments, one or more additional processor(s) 1015, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 1016. In some embodiments, second interconnect 1020 may be a low pin count (LPC) interconnect. Various devices may be coupled to second interconnect 1020 including, for example, a keyboard and/or mouse 1022, communication devices 1027 and a storage unit circuitry 1028. Storage unit circuitry 1028 may be a disk drive or other mass storage device which may include instructions/code and data 1030, in some embodiments. Further, an audio I/O 1024 may be coupled to second interconnect 1020. Note that other architectures than the point-to-point architecture described above are possible. For example, instead of the point-to-point architecture, a system such as multiprocessor system 1000 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 11:
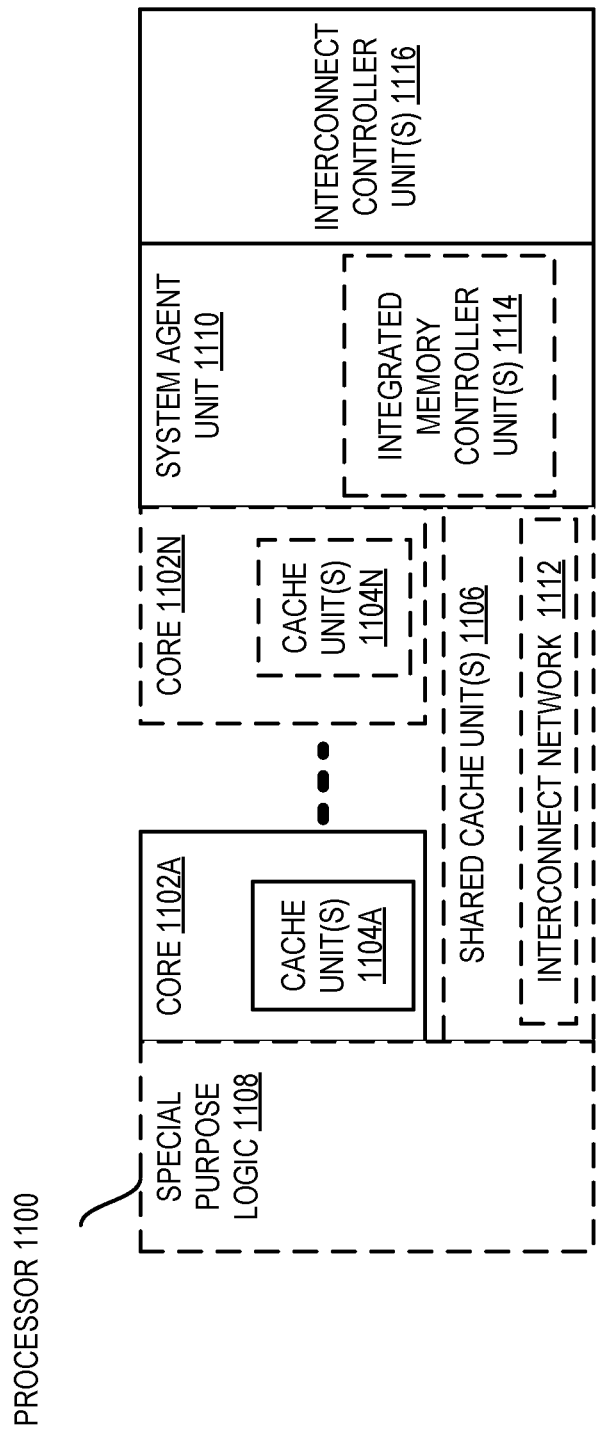
FIG. 11 illustrates a block diagram of embodiments of a processor that may have more than one core, may have an integrated memory controller, and may have integrated graphics.

FIG. 11 illustrates a block diagram of embodiments of a processor 1100 that may have more than one core, may have an integrated memory controller, and may have integrated graphics. The solid lined boxes illustrate a processor 1100 with a single core 1102A, a system agent 1110, a set of one or more interconnect controller units circuitry 1116, while the optional addition of the dashed lined boxes illustrates an alternative processor 1100 with multiple cores 1102(A)-(N), a set of one or more integrated memory controller unit(s) circuitry 1114 in the system agent unit circuitry 1110, and special purpose logic 1108, as well as a set of one or more interconnect controller units circuitry 1116. Note that the processor 1100 may be one of the processors 1070 or 1080, or co-processor 1038 or 1015 of FIG. 10.

Thus, different implementations of the processor 1100 may include: 1) a CPU with the special purpose logic 1108 being integrated graphics and/or scientific (throughput) logic (which may include one or more cores, not shown), and the cores 1102(A)-(N) being one or more general purpose cores (e.g., general purpose in-order cores, general purpose out-of-order cores, or a combination of the two); 2) a coprocessor with the cores 1102(A)-(N) being a large number of special purpose cores intended primarily for graphics and/or scientific (throughput); and 3) a coprocessor with the cores 1102(A)-(N) being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

A memory hierarchy includes one or more levels of cache unit(s) circuitry 1104(A)-(N) within the cores 1102(A)-(N), a set of one or more shared cache units circuitry 1106, and external memory (not shown) coupled to the set of integrated memory controller units circuitry 1114. The set of one or more shared cache units circuitry 1106 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 1112 interconnects the special purpose logic 1108 (e.g., integrated graphics logic), the set of shared cache units circuitry 1106, and the system agent unit circuitry 1110, alternative embodiments use any number of well-known techniques for interconnecting such units. In some embodiments, coherency is maintained between one or more of the shared cache units circuitry 1106 and cores 1102(A)-(N).

In some embodiments, one or more of the cores 1102(A)-(N) are capable of multi-threading. The system agent unit circuitry 1110 includes those components coordinating and operating cores 1102(A)-(N). The system agent unit circuitry 1110 may include, for example, power control unit (PCU) circuitry and/or display unit circuitry (not shown). The PCU may be or may include logic and components needed for regulating the power state of the cores 1102(A)-(N) and/or the special purpose logic 1108 (e.g., integrated graphics logic). The display unit circuitry is for driving one or more externally connected displays.

The cores 1102(A)-(N) may be homogenous or heterogeneous in terms of architecture instruction set; that is, two or more of the cores 1102(A)-(N) may be capable of executing the same instruction set, while other cores may be capable of executing only a subset of that instruction set or a different instruction set.

Exemplary Core Architectures
In-Order and Out-of-Order Core Block Diagram

Figure 12A:
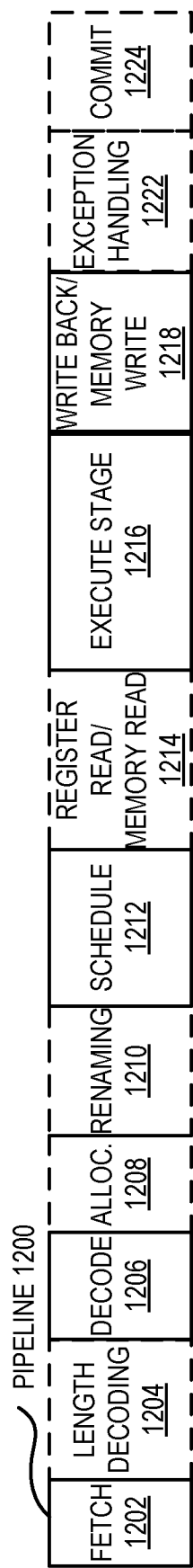
FIG. 12(A) is a block diagram illustrating both an exemplary in-order pipeline and an exemplary register renaming, out-of-order issue/execution pipeline according to embodiments.
Figure 12B:
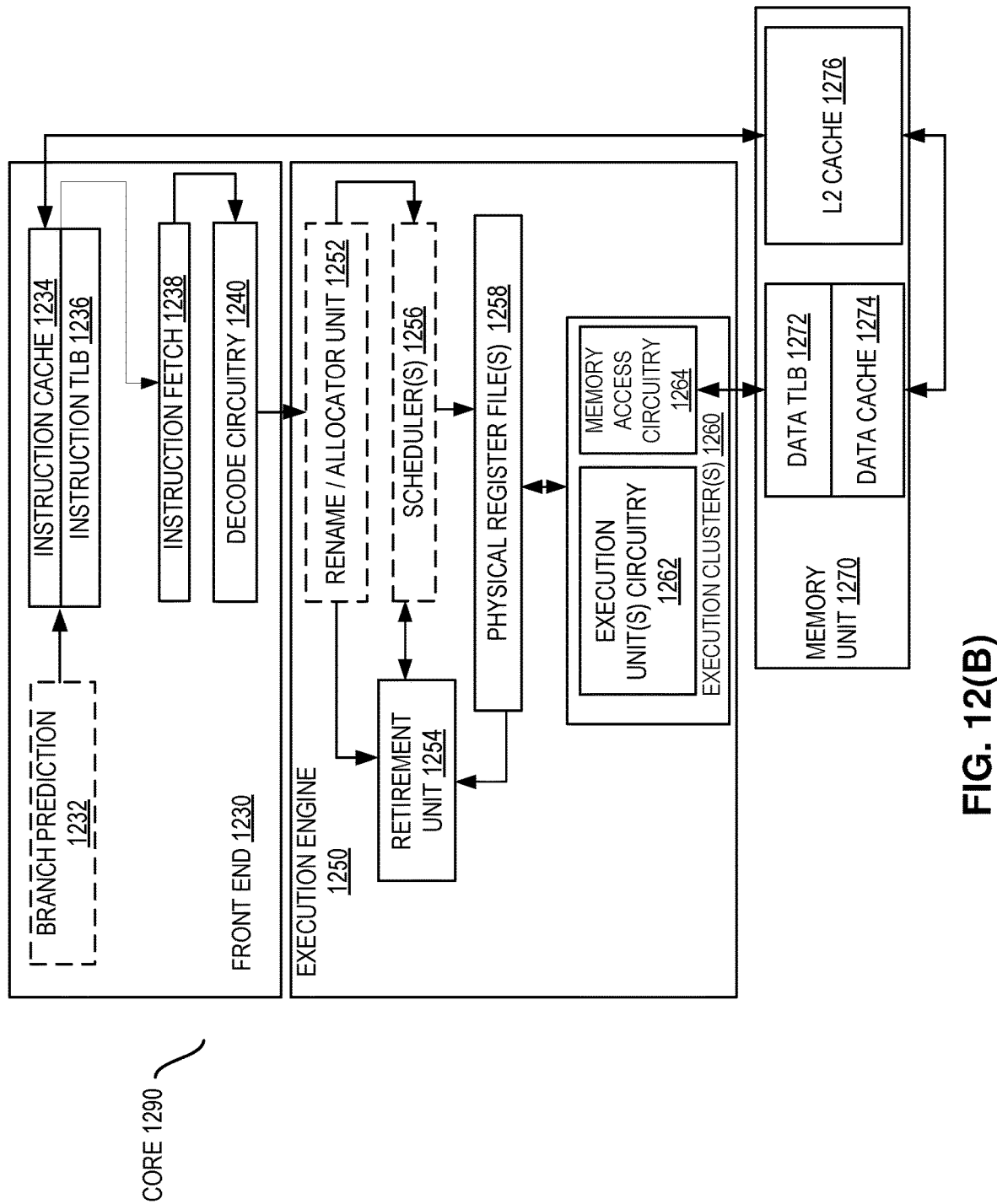
FIG. 12(B) is a block diagram illustrating both an exemplary embodiment of an in-order architecture core and an exemplary register renaming, out-of-order issue/execution architecture core to be included in a processor according to embodiments.

FIG. 12(A) is a block diagram illustrating both an exemplary in-order pipeline and an exemplary register renaming, out-of-order issue/execution pipeline according to embodiments. FIG. 12(B) is a block diagram illustrating both an exemplary embodiment of an in-order architecture core and an exemplary register renaming, out-of-order issue/execution architecture core to be included in a processor according to embodiments. The solid lined boxes in FIGS. 12(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12(A), a processor pipeline 12 00 includes a fetch stage 12 02, an optional length decode stage 12 04, a decode stage 12 06, an optional allocation stage 12 08, an optional renaming stage 12 10, a scheduling (also known as a dispatch or issue) stage 12 12, an optional register read/memory read stage 12 14, an execute stage 12 16, a write back/memory write stage 12 18, an optional exception handling stage 12 22, and an optional commit stage 12 24. One or more operations can be performed in each of these processor pipeline stages. For example, during the fetch stage 12 02, one or more instructions are fetched from instruction memory, during the decode stage 12 06, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 12 06 and the register read/memory read stage 12 14 may be combined into one pipeline stage. In one embodiment, during the execute stage 12 16, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 12 00 as follows: 1) the instruction fetch 12 38 performs the fetch and length decoding stages 12 02 and 12 04; 2) the decode unit circuitry 12 40 performs the decode stage 12 06; 3) the rename/allocator unit circuitry 12 52 performs the allocation stage 12 08 and renaming stage 12 10; 4) the scheduler unit(s) circuitry 12 56 performs the schedule stage 12 12; 5) the physical register file(s) unit(s) circuitry 12 58 and the memory unit circuitry 12 70 perform the register read/memory read stage 12 14; the execution cluster 12 60 perform the execute stage 12 16; 6) the memory unit circuitry 12 70 and the physical register file(s) unit(s) circuitry 12 58 perform the write back/memory write stage 12 18; 7) various units (unit circuitry) may be involved in the exception handling stage 12 22; and 8) the retirement unit circuitry 12 54 and the physical register file(s) unit(s) circuitry 12 58 perform the commit stage 12 24.

FIG. 12(B) shows processor core 1290 including front-end unit circuitry 1230 coupled to an execution engine unit circuitry 1250, and both are coupled to a memory unit circuitry 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit circuitry 1230 may include branch prediction unit circuitry 1232 coupled to an instruction cache unit circuitry 1234, which is coupled to an instruction translation lookaside buffer (TLB) 1236, which is coupled to instruction fetch unit circuitry 1238, which is coupled to decode unit circuitry 1240. In one embodiment, the instruction cache unit circuitry 1234 is included in the memory unit circuitry 1270 rather than the front-end unit circuitry 1230. The decode unit circuitry 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1240 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM (not shown) or other medium that stores microcode for certain macroinstructions (e.g., in decode unit circuitry 1240 or otherwise within the front end unit circuitry 1230). In one embodiment, the decode unit circuitry 1240 includes a micro-operation (micro-op) or operation cache (not shown) to hold/cache decoded operations, micro-tags, or micro-operations generated during the decode or other stages of the processor pipeline 1200. The decode unit circuitry 1240 may be coupled to rename/allocator unit circuitry 1252 in the execution engine unit circuitry 1250.

The execution engine circuitry 1250 includes the rename/allocator unit circuitry 1252 coupled to a retirement unit circuitry 1254 and a set of one or more scheduler(s) circuitry 1256. The scheduler(s) circuitry 1256 represents any number of different schedulers, including reservations stations, central instruction window, etc. In some embodiments, the scheduler(s) circuitry 1256 can include arithmetic logic unit (ALU) scheduler/scheduling circuitry, ALU queues, arithmetic generation unit (AGU) scheduler/scheduling circuitry, AGU queues, etc. The scheduler(s) circuitry 1256 is coupled to the physical register file(s) circuitry 1258. Each of the physical register file(s) circuitry 1258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 1258 includes vector registers unit circuitry, writemask registers unit circuitry, and scalar register unit circuitry. These register units may provide architectural vector registers, vector mask registers, general-purpose registers, etc. The physical register file(s) unit(s) circuitry 1258 is overlapped by the retirement unit circuitry 1254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1254 and the physical register file(s) circuitry 1258 are coupled to the execution cluster(s) 1260. The execution cluster(s) 1260 includes a set of one or more execution units circuitry 1262 and a set of one or more memory access circuitry 1264. The execution units circuitry 1262 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1256, physical register file(s) unit(s) circuitry 1258, and execution cluster(s) 1260 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1264). It should also be understood that where separate pipelines are used, one or more of these pipelines may be out-of-order issue/execution and the rest in-order.

In some embodiments, the execution engine unit circuitry 1250 may perform load store unit (LSU) address/data pipelining to an Advanced Microcontroller Bus (AHB) interface (not shown), and address phase and writeback, data phase load, store, and branches.

The set of memory access circuitry 1264 is coupled to the memory unit circuitry 1270, which includes data TLB unit circuitry 1272 coupled to a data cache circuitry 1274 coupled to a level 2 (L2) cache circuitry 1276. In one exemplary embodiment, the memory access units circuitry 1264 may include a load unit circuitry, a store address unit circuit, and a store data unit circuitry, each of which is coupled to the data TLB circuitry 1272 in the memory unit circuitry 1270. The instruction cache circuitry 1234 is further coupled to a level 2 (L2) cache unit circuitry 1276 in the memory unit circuitry 1270. In one embodiment, the instruction cache 1234 and the data cache 1274 are combined into a single instruction and data cache (not shown) in L2 cache unit circuitry 1276, a level 3 (L3) cache unit circuitry (not shown), and/or main memory. The L2 cache unit circuitry 1276 is coupled to one or more other levels of cache and eventually to a main memory.

The core 1290 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 1290 includes logic to support a packed data instruction set extension (e.g., AVX1, AVX2), thereby allowing the operations used by many multimedia applications to be performed using packed data.

Exemplary Execution Unit(s) Circuitry

Figure 13:
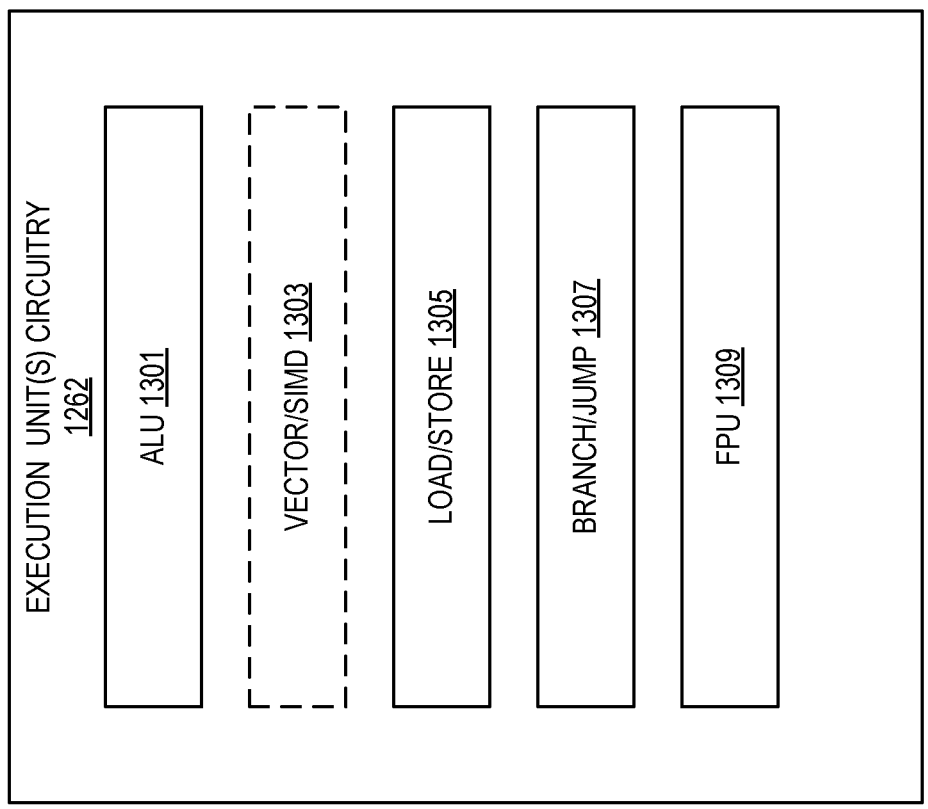
FIG. 13 illustrates embodiments of execution unit(s) circuitry.

FIG. 13 illustrates embodiments of execution unit(s) circuitry, such as execution unit(s) circuitry 1262 of FIG. 12(B). As illustrated, execution unit(s) circuitry 1262 may include one or more ALU circuits 1301, vector/SIMD unit circuits 1303, load/store unit circuits 1305, and/or branch/jump unit circuits 1307. ALU circuits 1301 perform integer arithmetic and/or Boolean operations. Vector/SIMD unit circuits 1303 perform vector/SIMD operations on packed data (such as SIMD/vector registers). Load/store unit circuits 1305 execute load and store instructions to load data from memory into registers or store from registers to memory. Load/store unit circuits 1305 may also generate addresses. Branch/jump unit circuits 1307 cause a branch or jump to a memory address depending on the instruction. Floating-point unit (FPU) circuits 1309 perform floating-point arithmetic. The width of the execution unit(s) circuitry 1262 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 14:
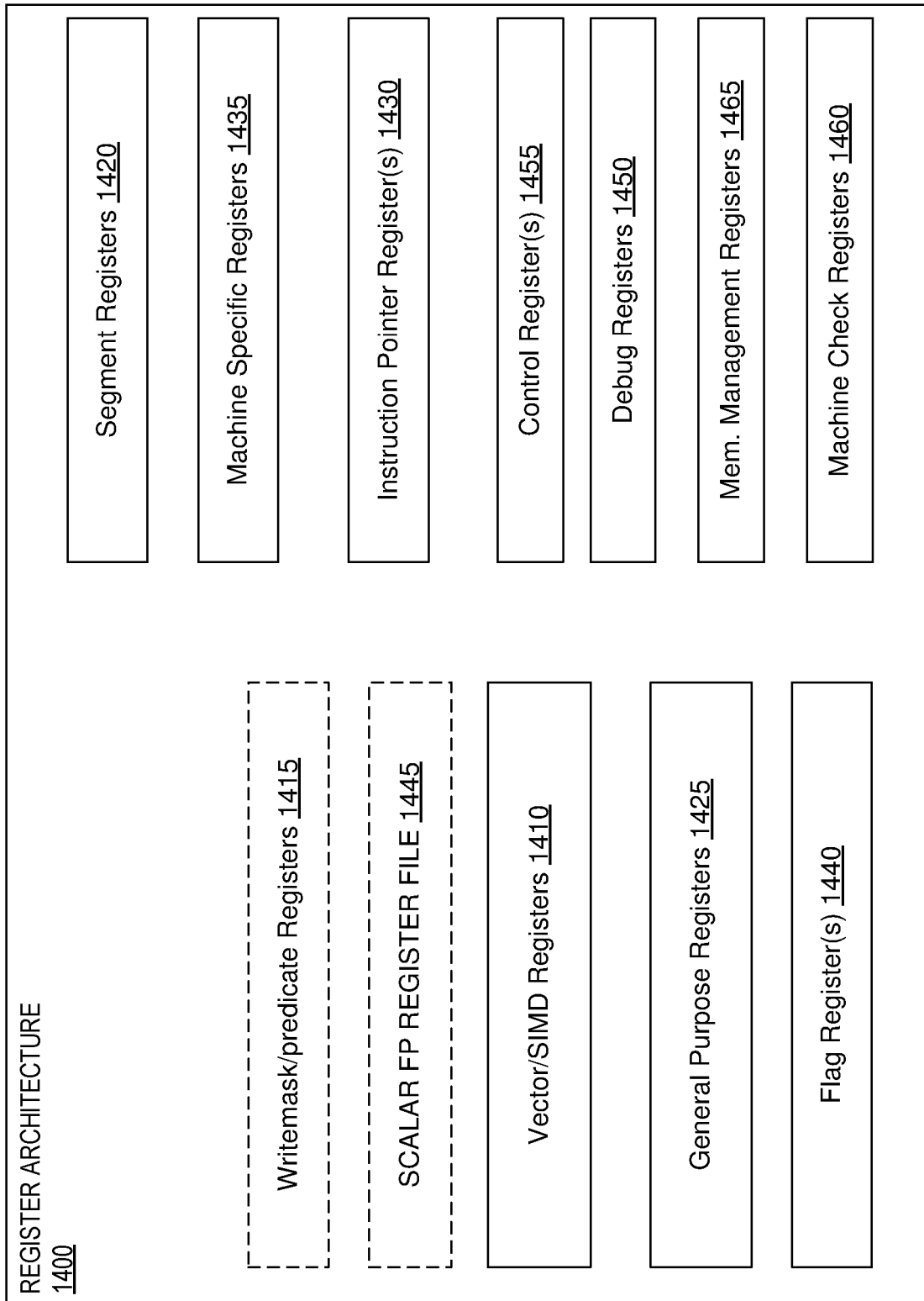
FIG. 14 is a block diagram of a register architecture according to some embodiments.

FIG. 14 is a block diagram of a register architecture 1400 according to some embodiments. As illustrated, there are vector/SIMD registers 1410 that vary from 128-bit to 1,024 bits width. In some embodiments, the vector/SIMD registers 1410 are physically 512-bits and, depending upon the mapping, only some of the lower bits are used. For example, in some embodiments, the vector/SIMD registers 1410 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1400 includes writemask/predicate registers 1415. For example, in some embodiments, there are 8 writemask/predicate registers (sometimes called k0 through k7) that are each 16-bit, 32-bit, 64-bit, or 128-bit in size. Writemask/predicate registers 1415 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1415 corresponds to a data element position of the destination. In other embodiments, the writemask/predicate registers 1415 are scalable and consists of a set number of enable bits for a given vector element (e.g., 8 enable bits per 64-bit vector element).

The register architecture 1400 includes a plurality of general-purpose registers 1425. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1400 includes scalar floating-point register 1445 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1440 (e.g., EFLAGS, RFLAGS, etc.) store status and control information for arithmetic, compare, and system operations. For example, the one or more flag registers 1440 may store condition code information such as carry, parity, auxiliary carry, zero, sign, and overflow. In some embodiments, the one or more flag registers 1440 are called program status and control registers.

Segment registers 1420 contain segment points for use in accessing memory. In some embodiments, these registers are referenced by the names CS, DS, SS, ES, FS, and GS.

Machine specific registers (MSRs) 1435 control and report on processor performance. Most MSRs 1435 handle system-related functions and are not accessible to an application program. Machine check registers 1460 consist of control, status, and error reporting MSRs that are used to detect and report on hardware errors.

One or more instruction pointer register(s) 1430 store an instruction pointer value. Control register(s) 1455 (e.g., CR0-CR4) determine the operating mode of a processor (e.g., processor 1070, 1080, 1038, 1015, and/or 1100) and the characteristics of a currently executing task. Debug registers 1450 control and allow for the monitoring of a processor or core's debugging operations.

Memory management registers 1465 specify the locations of data structures used in protected mode memory management. These registers may include a GDTR, IDRT, task register, and a LDTR register.

Alternative embodiments may use wider or narrower registers. Additionally, alternative embodiments may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 15:
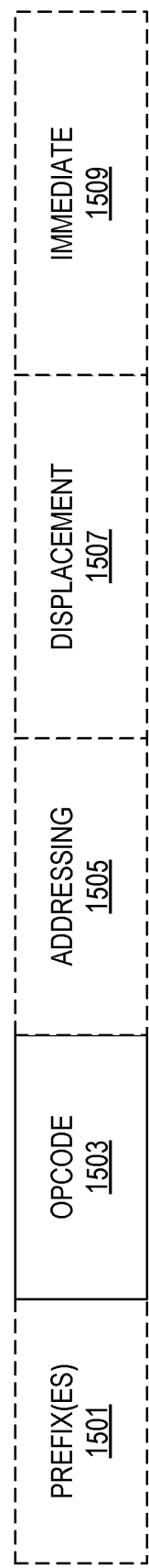
FIG. 15 illustrates embodiments of an instruction format.

FIG. 15 illustrates embodiments of an instruction format. As illustrated, an instruction may include multiple components including, but not limited to, one or more fields for: one or more prefixes 1501, an opcode 1503, addressing information 1505 (e.g., register identifiers, memory addressing information, etc.), a displacement value 1507, and/or an immediate 1509. Note that some instructions utilize some or all of the fields of the format whereas others may only use the field for the opcode 1503. In some embodiments, the order illustrated is the order in which these fields are to be encoded, however, it should be appreciated that in other embodiments these fields may be encoded in a different order, combined, etc.

The prefix(es) field(s) 1501, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1503 is used to at least partially define the operation to be performed upon a decoding of the instruction. In some embodiments, a primary opcode encoded in the opcode field 1503 is 1, 2, or 3 bytes in length. In other embodiments, a primary opcode can be a different length. An additional 3-bit opcode field is sometimes encoded in another field.

Figure 16:
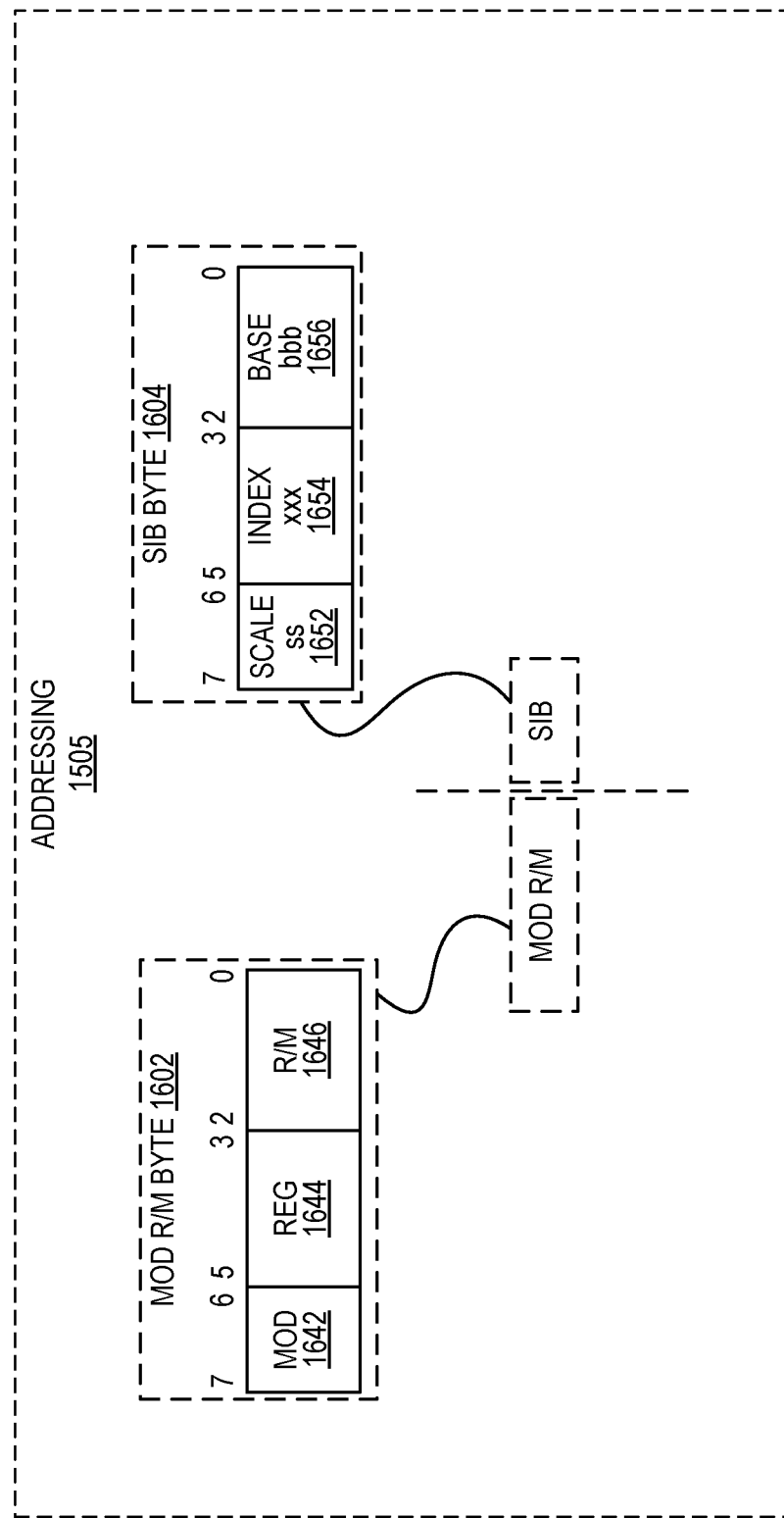
FIG. 16 illustrates embodiments of the addressing field.

The addressing field 1505 is used to address one or more operands of the instruction, such as a location in memory or one or more registers. FIG. 16 illustrates embodiments of the addressing field 1505. In this illustration, an optional Mod R/M byte 1602 and an optional Scale, Index, Base (SIB) byte 1604 are shown. The Mod R/M byte 1602 and the SIB byte 1604 are used to encode up to two operands of an instruction, each of which is a direct register or effective memory address. Note that each of these fields are optional in that not all instructions include one or more of these fields. The MOD R/M byte 1602 includes a MOD field 1642, a register field 1644, and R/M field 1646.

The content of the MOD field 1642 distinguishes between memory access and non-memory access modes. In some embodiments, when the MOD field 1642 has a value of b11, a register-direct addressing mode is utilized, and otherwise register-indirect addressing is used.

The register field 1644 may encode either the destination register operand or a source register operand, or may encode an opcode extension and not be used to encode any instruction operand. The content of register index field 1644, directly or through address generation, specifies the locations of a source or destination operand (either in a register or in memory). In some embodiments, the register field 1644 is supplemented with an additional bit from a prefix (e.g., prefix 1501) to allow for greater addressing.

The R/M field 1646 may be used to encode an instruction operand that references a memory address, or may be used to encode either the destination register operand or a source register operand. Note the R/M field 1646 may be combined with the MOD field 1642 to dictate an addressing mode in some embodiments.

The SIB byte 1604 includes a scale field 1652, an index field 1654, and a base field 1656 to be used in the generation of an address. The scale field 1652 indicates scaling factor. The index field 1654 specifies an index register to use. In some embodiments, the index field 1654 is supplemented with an additional bit from a prefix (e.g., prefix 1501) to allow for greater addressing. The base field 1656 specifies a base register to use. In some embodiments, the base field 1656 is supplemented with an additional bit from a prefix (e.g., prefix 1501) to allow for greater addressing. In practice, the content of the scale field 1652 allows for the scaling of the content of the index field 1654 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1507 provides this value. Additionally, in some embodiments, a displacement factor usage is encoded in the MOD field of the addressing field 1505 that indicates a compressed displacement scheme for which a displacement value is calculated by multiplying disp8 in conjunction with a scaling factor N that is determined based on the vector length, the value of a-bit bit, and the input element size of the instruction. The displacement value is stored in the displacement field 1507.

In some embodiments, an immediate field 1509 specifies an immediate for the instruction. An immediate may be encoded as a 1-byte value, a 2-byte value, a 4-byte value, etc.

Figure 17:
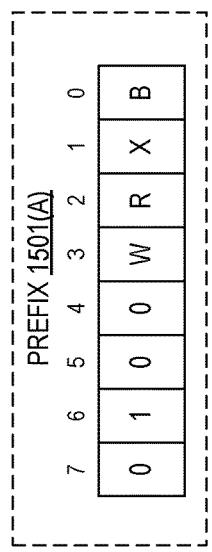
FIG. 17 illustrates embodiments of a first prefix.

FIG. 17 illustrates embodiments of a first prefix 1501(A). In some embodiments, the first prefix 1501(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1501(A) may specify up to three registers using 3-bit fields depending on the format: 1) using the reg field 1644 and the R/M field 1646 of the Mod R/M byte 1602; 2) using the Mod R/M byte 1602 with the SIB byte 1604 including using the reg field 1644 and the base field 1656 and index field 1654; or 3) using the register field of an opcode.

In the first prefix 1501(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1644 and MOD R/M R/M field 1646 alone can each only address 8 registers.

In the first prefix 1501(A), bit position 2 (R) may an extension of the MOD R/M reg field 1644 and may be used to modify the Mod R/M reg field 1644 when that field encodes a general purpose register, a 64-bit packed data register (e.g., a SSE register), or a control or debug register. R is ignored when Mod R/M byte 1602 specifies other registers or defines an extended opcode.

Bit position 1 (X) X bit may modify the SIB byte index field 1654.

Bit position-bit (B)-bit may modify the base in the Mod R/M R/M field 1646 or the SIB byte base field 1656; or it may modify the opcode register field used for accessing general purpose registers (e.g., general purpose registers 1425).

Figure 18A:
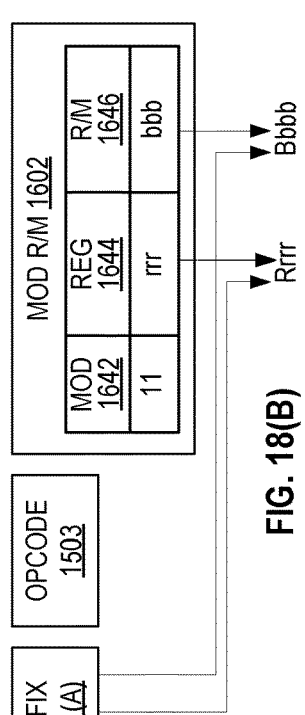
FIGS. 18(A)-(D) illustrate embodiments of how the R, X, and-bit fields of the first prefix are used.
Figure 18B:
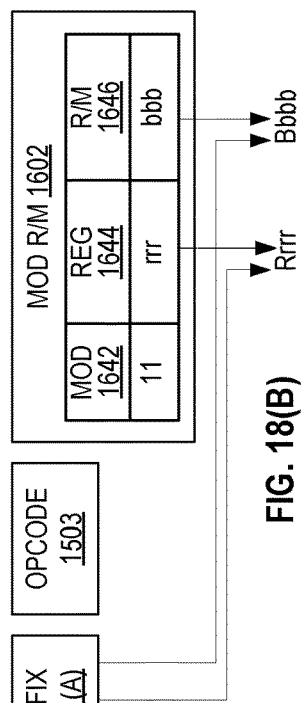
Figure 18C:
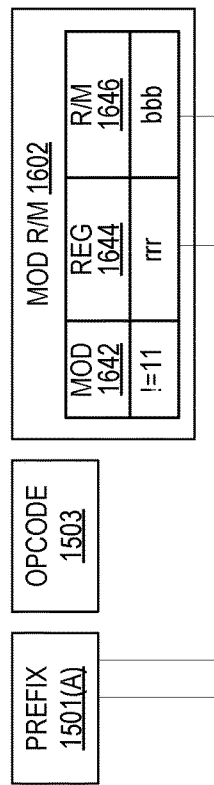
Figure 18D:
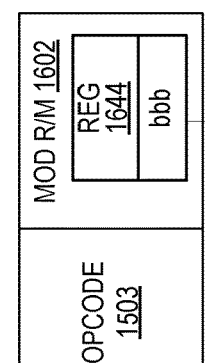

FIGS. 18(A)-(D) illustrate embodiments of how the R, X, and-bit fields of the first prefix 1501(A) are used. FIG. 18(A) illustrates R and-bit from the first prefix 1501(A) being used to extend the reg field 1644 and R/M field 1646 of the MOD R/M byte 1602 when the SIB byte 1604 is not used for memory addressing. FIG. 18(B) illustrates R and-bit from the first prefix 1501(A) being used to extend the reg field 1644 and R/M field 1646 of the MOD R/M byte 1602 when the SIB byte 1604 is not used (register-register addressing). FIG. 18(C) illustrates R, X, and-bit from the first prefix 1501(A) being used to extend the reg field 1644 of the MOD R/M byte 1602 and the index field 1654 and base field 1656 when the SIB byte 1604 being used for memory addressing. FIG. 18(D) illustrates-bit from the first prefix 1501(A) being used to extend the reg field 1644 of the MOD R/M byte 1602 when a register is encoded in the opcode 1503.

FIGS. 19(A)-(B) illustrate embodiments of a second prefix 1501(B). In some embodiments, the second prefix 1501(B) is an embodiment of a VEX prefix. The second prefix 1501(B) encoding allows instructions to have more than two operands, and allows SIMD vector registers (e.g., vector/SIMD registers 1410) to be longer than 64-bits (e.g., 128-bit and 256-bit). The use of the second prefix 1501(B) provides for three-operand (or more) syntax. For example, previous two-operand instructions performed operations such as A=A+B, which overwrites a source operand. The use of the second prefix 1501(B) enables operands to perform nondestructive operations such as A=−bit+C.

In some embodiments, the second prefix 1501(B) comes in two forms—a two-byte form and a three-byte form. The two-byte second prefix 1501(B) is used mainly for 128-bit, scalar, and some 256-bit instructions; while the three-byte second prefix 1501(B) provides a compact replacement of the first prefix 1501(A) and 3-byte opcode instructions.

FIG. 19(A) illustrates embodiments of a two-byte form of the second prefix 1501(B). In one example, a format field 1901 (byte 0 1903) contains the value C5H. In one example, byte 11905 includes a "R" value in bit[7]. This value is the complement of the same value of the first prefix 1501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1646 to encode the instruction operand that references a memory address or encode either the destination register operand or a source register operand.

Instructions that use this prefix may use the Mod R/M reg field 1644 to encode either the destination register operand or a source register operand, be treated as an opcode extension and not used to encode any instruction operand.

For instruction syntax that support four operands, vvvv, the Mod R/M R/M field 1646 and the Mod R/M reg field 1644 encode three of the four operands. Bits[7:4] of the immediate 1509 are then used to encode the third source register operand.

FIG. 19(B) illustrates embodiments of a three-byte form of the second prefix 1501(B). in one example, a format field 1911 (byte 0 1913) contains the value C4H. Byte 11915 includes in bits[7:5] "R," "X," and "B" which are the complements of the same values of the first prefix 1501(A). Bits[4:0] of byte 11915 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1917 is used similar to W of the first prefix 1501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1646 to encode the instruction operand that references a memory address or encode either the destination register operand or a source register operand.

Instructions that use this prefix may use the Mod R/M reg field 1644 to encode either the destination register operand or a source register operand, be treated as an opcode extension and not used to encode any instruction operand.

For instruction syntax that support four operands, vvvv, the Mod R/M R/M field 1646, and the Mod R/M reg field 1644 encode three of the four operands. Bits[7:4] of the immediate 1509 are then used to encode the third source register operand.

Figure 20:
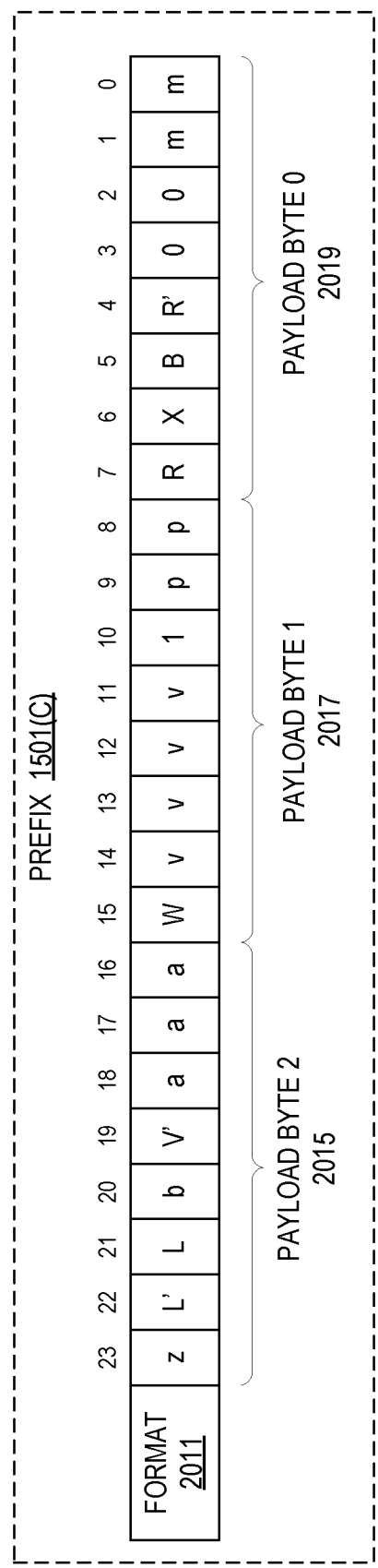
FIG. 20 illustrates embodiments of a third prefix.

FIG. 20 illustrates embodiments of a third prefix 1501(C). In some embodiments, the first prefix 1501(A) is an embodiment of an EVEX prefix. The third prefix 1501(C) is a four-byte prefix.

The third prefix 1501(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 14) or predication utilize this prefix. Opmask register allow for conditional processing or selection control. Opmask instructions, whose source/destination operands are opmask registers and treat the content of an opmask register as a single value, are encoded using the second prefix 1501(B).

The third prefix 1501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1501(C) is a format field 2011 that has a value, in one example, of 62H. Subsequent bytes are referred to as payload bytes 2015-2019 and collectively form a 24-bit value of P[23:0] providing specific capability in the form of one or more fields (detailed herein).

In some embodiments, P[1:0] of payload byte 2019 are identical to the low two mmmmm bits. P[3:2] are reserved in some embodiments. Bit P[4] (R') allows access to the high 16 vector register set when combined with P[7] and the Mod R/M reg field 1644. P[6] can also provide access to a high 16 vector register when SIB-type addressing is not needed. P[7:5] consist of an R, X, and-bit which are operand specifier modifier bits for vector register, general purpose register, memory addressing and allow access to the next set of 8 registers beyond the low 8 registers when combined with the Mod R/M register field 1644 and Mod R/M R/M field 1646. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 1501(A) and second prefix 1511(B) and may serve as an opcode extension bit or operand size promotion.

P[18:16] specify the index of a register in the opmask (writemask) registers (e.g., writemask/predicate registers 1415). In one embodiment, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1501(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
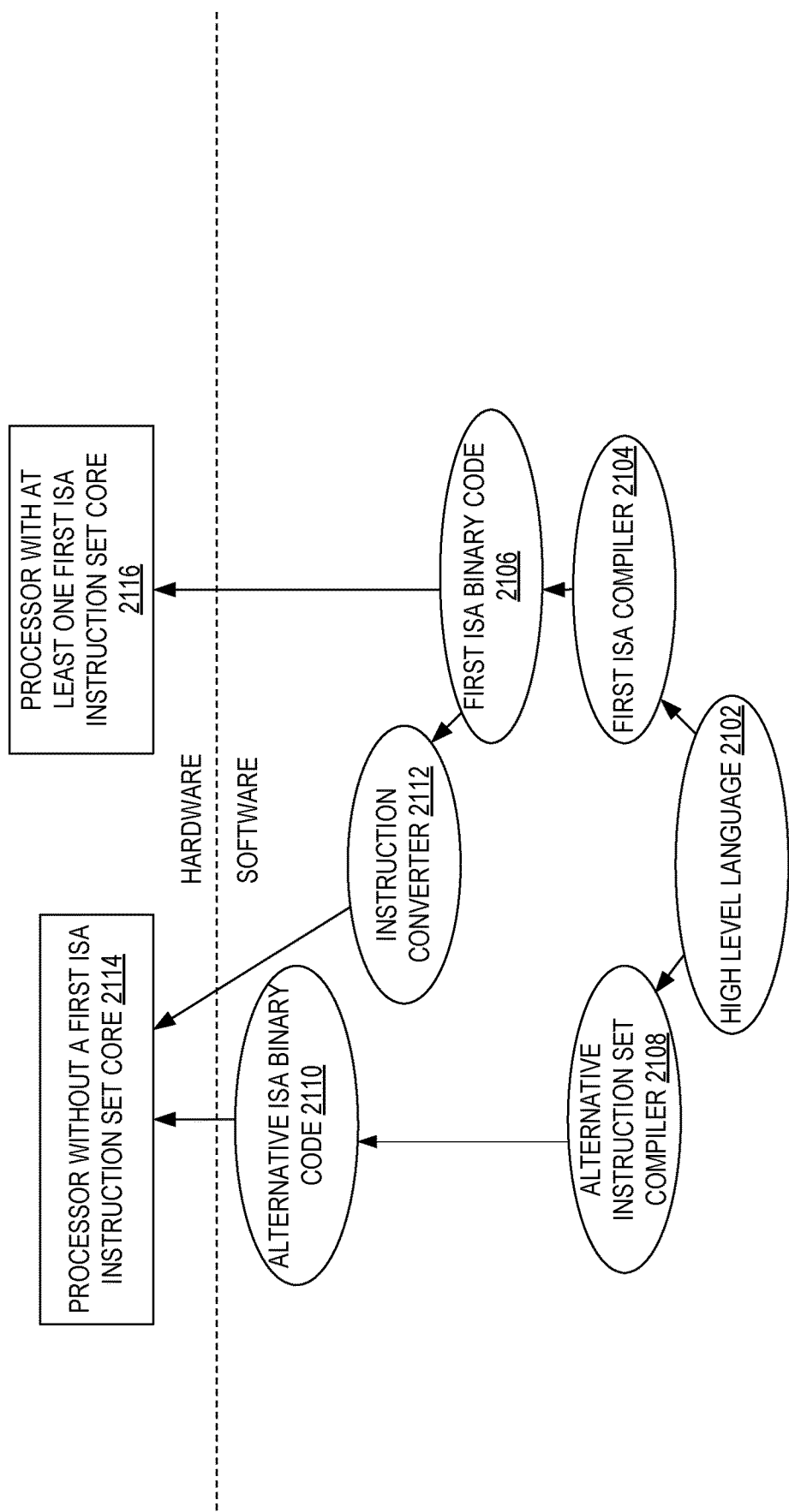
FIG. 21 illustrates a block diagram contrasting the use of a software instruction converter to convert binary instructions in a source instruction set to binary instructions in a target instruction set according to embodiments.

FIG. 21 illustrates a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 21 shows a program in a high level language 2102 may be compiled using a first ISA compiler 2104 to generate first ISA binary code 2106 that may be natively executed by a processor with at least one first instruction set core 2116. The processor with at least one first ISA instruction set core 2116 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2104 represents a compiler that is operable to generate first ISA binary code 2106 (e.g., object code) that can, with or without additional linkage processing, be executed on the processor with at least one first ISA instruction set core 2116. Similarly, FIG. 21 shows the program in the high level language 2102 may be compiled using an alternative instruction set compiler 2108 to generate alternative instruction set binary code 2110 that may be natively executed by a processor without a first ISA instruction set core 2114. The instruction converter 2112 is used to convert the first ISA binary code 2106 into code that may be natively executed by the processor without a first ISA instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have a first ISA instruction set processor or core to execute the first ISA binary code 2106.

Exemplary embodiments include, but are not limited to:
1. An apparatus comprising:
   memory controller circuitry to send read and write requests to a memory device, the memory controller circuitry to couple to the memory device using an address bus, a control bus, and a data bus; and
   memory protection circuitry to generate protected address data to be sent on the address bus to the memory device.
2. The apparatus of example 1, wherein the address data on the address bus is to be protected using a message authentication code (MAC) that is to be generated one the address data and to be sent in a different cycle than the protected address data.
3. The apparatus of example 2, wherein the MAC is to be generated by an authentication unit performing a GHASH function.
4. The apparatus of example 2, wherein the memory protection circuitry is to encrypt the address, wherein the protection of the address data comprises the encrypted data and the MAC.
5. The apparatus of example 4, wherein the memory protection circuitry comprises a cryptographic unit that is to support the usage of multiple encryption keys and AES-XTS encryption.
6. The apparatus of example 1, wherein data on the data bus is to be encrypted.
7. The apparatus of example 1, further comprising: a memory device to verify a received request by comparing a generated MAC with a received protected address data MAC.
8. The apparatus of example 8, wherein the memory device is to store a randomized replay tree, the memory device to
9. An apparatus comprising:
   a controller to receive a memory request, the request comprising at least address data and control data;
   a memory device to store a randomized replay tree; and
   replay logic to respond determine one or more actions to perform based on a type of request received, wherein for a read request the replay logic is to cause a generation of random number, compare the random number to a threshold value, and when the random number is greater than the threshold value, is to perform a tree walk of the randomized replay tree to verify the request for freshness and when the random number is less than the threshold value, is to skip any tree walk of the randomized replay tree.
10. The apparatus of example 9, wherein the randomized replay tree comprises at least one counter level and metadata including version and MAC data
11. The apparatus of example 10, wherein a counter level at the top of the randomized replay tree is store off of the memory device.
12. The apparatus of example 9, where in the threshold value is set by an execution of an instruction.
13. The apparatus of example 9, wherein the threshold value is set by a basic input/output system (BIOS).
14. The apparatus of example 9, wherein the replay logic is to respond to a write request by performing a tree walk of the randomized replay tree.
15. The apparatus of example 9, further comprising:
   memory controller circuitry to send read and write requests to the memory device, the memory controller circuitry to couple to the memory device using an address bus, a control bus, and a data bus; and
   memory protection circuitry to generate protected address data to be sent on the address bus to the memory device.
16. A system comprising:
   a memory device to store a randomized replay tree and data; and
   memory controller circuitry to send read and write requests to a memory device, the memory controller circuitry to couple to the memory device using an address bus, a control bus, and a data bus;
   memory protection circuitry to generate protected address data to be sent on the address bus to the memory device;
   replay logic to respond determine one or more actions to perform based on a type of request received, wherein for a read request the replay logic is to cause a generation of random number, compare the random number to a threshold value, and when the random number is greater than the threshold value, is to perform a tree walk of the randomized replay tree to verify the request for freshness and when the random number is less than the threshold value, is to skip any tree walk of the randomized replay tree.
17. The system of example 16, wherein the address data on the address bus is to be protected using a message authentication code (MAC) that is to be generated one the address data and to be sent in a different cycle than the protected address data.

18. The system of example 17, wherein the memory protection circuitry is to encrypt the address, wherein the protection of the address data comprises the encrypted data and the MAC.

19. The system of example 16, wherein the randomized replay tree comprises at least one counter level and metadata including version and MAC data 20. The system of example 16, where in the threshold value is set by an execution of an instruction.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   a controller to receive a memory request, the request comprising at least address data and control data;
   a memory device to store a randomized replay tree; and
   replay logic to determine one or more actions to perform based on a type of request received, wherein for a read request the replay logic is to cause a generation of random number, compare the random number to a threshold value, and when the random number is greater than the threshold value, is to perform a tree walk of the randomized replay tree to verify the request for freshness and when the random number is less than the threshold value, is to skip any tree walk of the randomized replay tree.

2. The apparatus of claim 1, wherein the randomized replay tree comprises at least one counter level and metadata including version and MAC data.

3. The apparatus of claim 2, wherein a counter level at a top of the randomized replay tree is to be stored off of the memory device.

4. The apparatus of claim 1, wherein the threshold value is set by an execution of an instruction.

5. The apparatus of claim 1, wherein the threshold value is set by a basic input/output system (BIOS).

6. The apparatus of claim 1, wherein the replay logic is to respond to a write request by performing a tree walk of the randomized replay tree.

7. The apparatus of claim 1, further comprising:
   memory controller circuitry to send read and write requests to the memory device, the memory controller circuitry to couple to the memory device using an address bus, a control bus, and a data bus; and
   memory protection circuitry to generate protected address data to be sent on the address bus to the memory device.

8. A system comprising:
   a memory device to store a randomized replay tree and data;
   memory controller circuitry to send read and write requests to a memory device, the memory controller circuitry to couple to the memory device using an address bus, a control bus, and a data bus;
   memory protection circuitry to generate protected address data to be sent on the address bus to the memory device; and
   replay logic to determine one or more actions to perform based on a type of request received, wherein for a read request the replay logic is to cause a generation of random number, compare the random number to a threshold value, and when the random number is greater than the threshold value, is to perform a tree walk of the randomized replay tree to verify the request for freshness and when the random number is less than the threshold value, is to skip any tree walk of the randomized replay tree.

9. The system of claim 8, wherein the address data on the address bus is to be protected using a message authentication code (MAC) that is to be generated for the address data and to be sent in a different cycle than the protected address data.

10. The system of claim 9, wherein the memory protection circuitry is to encrypt the address, wherein the protection of the address data comprises the encrypted data and the MAC.

11. The system of claim 8, wherein the randomized replay tree comprises at least one counter level and metadata including version and MAC data.

12. The system of claim 8, wherein the threshold value is set by an execution of an instruction.

* * * * *